US009808071B2

(12) United States Patent
Thiebaut et al.

(10) Patent No.: US 9,808,071 B2
(45) Date of Patent: Nov. 7, 2017

(54) APPARATUS FOR DISPENSING COSMETIC MATERIAL

(71) Applicant: L'OREAL, Paris (FR)

(72) Inventors: Géraldine Thiebaut, Neuilly-sur-Seine (FR); Jean-Baptiste Blanc, Chatenay Malabry (FR); Frank Giron, Lagny sur Marne (FR); Eric Wing-Jing Lam, Millbrae, CA (US); Helga C. Malaprade, Vincennes (FR); Rafal M. Pielak, Richmond, CA (US); Henri Samain, Bievres (FR); Marcie Lynne Hamilton, San Francisco, CA (US); Philipe Roget Manoux, Oakland, CA (US); Andrew Timm Windler, San Francisco, CA (US)

(73) Assignee: L'OREAL, Paris (FR)

( * ) Notice: Subject to any disclaimer, the term of this patent is extended or adjusted under 35 U.S.C. 154(b) by 0 days.

(21) Appl. No.: 15/008,142

(22) Filed: Jan. 27, 2016

(65) Prior Publication Data

US 2017/0208920 A1    Jul. 27, 2017

(51) Int. Cl.
*A45D 44/00* (2006.01)
*B05B 11/00* (2006.01)
(Continued)

(52) U.S. Cl.
CPC ........ *A45D 44/005* (2013.01); *B05B 11/0054* (2013.01); *A45D 40/24* (2013.01);
(Continued)

(58) Field of Classification Search
CPC ...... A45D 44/005; A45D 19/00; A45D 29/00; A45D 29/18; A45D 29/20;
(Continued)

(56) References Cited

U.S. PATENT DOCUMENTS

| 3,242,881 | A | * | 3/1966 | Schafer | .................. | A21C 11/16 |
| | | | | | | 222/132 |
| 5,163,010 | A | * | 11/1992 | Klein | ..................... | A45D 44/00 |
| | | | | | | 222/135 |

(Continued)

OTHER PUBLICATIONS

International Search Report and Written Opinion dated May 11, 2017 in PCT/US2017/015094.

*Primary Examiner* — Paul R Durand
*Assistant Examiner* — Andrew P Bainbridge
(74) *Attorney, Agent, or Firm* — Oblon, McClelland, Maier & Neustadt, L.L.P.

(57) ABSTRACT

An apparatus is provided for dispensing cosmetic material. The apparatus includes a dispensing assembly configured to receive at least one cartridge that contains a cosmetic material and to dispense a specified amount of the cosmetic material from the cartridge into a receiving area; a memory configured to receive and store dispensing information which includes the specified amount of the cosmetic material to be dispensed for each cartridge disposed in the dispensing assembly to achieve a specified single use of a cosmetic application; and circuitry configured to obtain the dispensing information from the memory and to control the dispensing assembly to dispense the cosmetic material from each cartridge disposed in the dispensing assembly into the receiving area according to the one or more specified amounts included in the dispensing information.

15 Claims, 16 Drawing Sheets

(51) Int. Cl.
*G01J 3/46* (2006.01)
*A45D 40/24* (2006.01)
*G05D 11/13* (2006.01)

(52) U.S. Cl.
CPC .......... *B05B 11/0097* (2013.01); *G01J 3/46* (2013.01); *G05D 11/132* (2013.01)

(58) Field of Classification Search
CPC .......... A45D 2200/058; A45D 40/24; B05B 11/0054; B05B 11/0005; B05B 11/0024; B05B 11/0097; G01J 3/46; G05D 11/13; G05D 11/132
USPC ..... 700/231, 265, 233; 8/405; 132/317, 286, 132/294, 314–315; 141/18, 113, 141/234–238, 247, 380–381; 356/402; 222/333, 325–327, 130–139, 386, 63–66, 222/144.5, 145.5
See application file for complete search history.

(56) References Cited

U.S. PATENT DOCUMENTS

| | | | | |
|---|---|---|---|---|
| 5,697,527 | A * | 12/1997 | Altieri, Jr. | B01F 13/1055 222/132 |
| 5,992,686 | A | 11/1999 | Cline et al. | |
| 6,161,723 | A | 12/2000 | Cline et al. | |
| 6,675,988 | B2 | 1/2004 | Cline et al. | |
| 6,913,166 | B2 | 7/2005 | Cline et al. | |
| 6,935,386 | B2 * | 8/2005 | Miller | B01F 13/1055 141/104 |
| 6,991,004 | B2 * | 1/2006 | Kaufhold | B01F 13/1055 141/104 |
| 7,206,664 | B2 * | 4/2007 | Schmid | B01F 13/1055 700/239 |
| 7,264,161 | B2 * | 9/2007 | Polarine | G06Q 10/087 235/385 |
| 8,256,647 | B2 * | 9/2012 | Engels | B01F 7/1695 141/104 |
| 8,561,841 | B2 * | 10/2013 | Erman | A47J 31/402 222/135 |
| 8,567,643 | B2 * | 10/2013 | Solera | B01F 13/1058 222/144 |
| 8,622,248 | B2 * | 1/2014 | Sacchet | B01F 13/1058 222/138 |
| 8,830,467 | B2 | 9/2014 | Igarashi | |
| 8,950,447 | B2 * | 2/2015 | De Rosa | A47K 5/1217 141/113 |
| 8,977,389 | B2 * | 3/2015 | Witchell | G01F 1/42 700/233 |
| 9,007,588 | B1 * | 4/2015 | Igarashi | G05D 11/132 356/402 |
| 9,498,974 | B2 | 11/2016 | Choi | |
| 2001/0047309 | A1 * | 11/2001 | Bartholomew | A45D 29/00 700/233 |
| 2002/0155069 | A1 * | 10/2002 | Pruche | A01K 11/005 424/47 |
| 2003/0160072 | A1 * | 8/2003 | Geiser | A61M 5/24 222/327 |
| 2005/0236429 | A1 * | 10/2005 | Duck | B67D 1/0878 222/137 |
| 2008/0047972 | A1 * | 2/2008 | Bartholomew | A45D 44/005 222/1 |
| 2008/0245383 | A1 * | 10/2008 | Tomandl | A45D 33/008 132/200 |
| 2009/0044827 | A1 * | 2/2009 | Zilber | A45D 40/00 132/297 |
| 2011/0304877 | A1 * | 12/2011 | Bitoh | A45D 29/00 358/1.15 |
| 2014/0082854 | A1 * | 3/2014 | Landa | A45D 19/02 8/405 |
| 2014/0277704 | A1 * | 9/2014 | Memar | B01F 13/1063 700/233 |
| 2015/0173488 | A1 | 6/2015 | Witchell et al. | |
| 2016/0082403 | A1 * | 3/2016 | Ounzar | B01F 13/1066 366/150.1 |

* cited by examiner

APPARATUS FOR DISPENSING COSMETIC MATERIAL

BACKGROUND

Field

The disclosure herein generally relates to a system, apparatus, and method for determining a combination of cosmetic materials which can be blended and dispensed for a particular user.

SUMMARY

The present disclosure is directed to a system and method for dispensing cosmetic material.

The foregoing general description of the illustrative implementations and the following detailed description thereof are merely exemplary aspects of the teachings of this disclosure, and are not restrictive.

In an embodiment, an apparatus is provided for dispensing cosmetic material, including a dispensing assembly configured to receive at least one cartridge that contains a cosmetic material and to dispense a specified amount of the cosmetic material from the cartridge into a receiving area; a memory configured to receive and store dispensing information which includes the specified amount of the cosmetic material to be dispensed for each cartridge disposed in the dispensing assembly to achieve a specified single use of a cosmetic application; and circuitry configured to obtain the dispensing information from the memory and to control the dispensing assembly to dispense the cosmetic material from each cartridge disposed in the dispensing assembly into the receiving area according to the one or more specified amounts included in the dispensing information.

In an embodiment, the dispensing assembly is configured to receive a plurality of cartridges that contain different cosmetic material and to simultaneously dispense a specified amount of the respective cosmetic material from each of the cartridges into the receiving area to be mixed together.

In an embodiment, the receiving area is configured to be part of a detachable portion of the apparatus.

In an embodiment, the detachable portion is configured to be an enclosed container that holds the dispensed cosmetic material.

In an embodiment, the apparatus further includes a manifold, having a plurality of manifold through holes, the manifold connected to and disposed on a nozzle of the cartridge, the receiving area being connected to and disposed above the manifold, and the circuitry controls the dispensing assembly to dispense a quantity of cosmetic material from the nozzle of the cartridge through one manifold through hole of the manifold, and into the receiving area.

In an embodiment, the enclosed container includes: a top lid; a base, having a plurality of base through holes; and a bottom lid, having a plurality of bottom lid through holes. The top lid is connected to a first side of the base, the bottom lid is connected to a second side of the base, the bottom lid is connected to the manifold, the plurality of manifold through holes are aligned with and connected to the plurality of bottom lid through holes, the plurality of base through holes aligned with and connected to the plurality of base through holes.

In an embodiment, the enclosed container further includes: a plurality of mounting magnets, disposed between the base and the bottom lid, and the plurality of mounting magnets magnetically secure the enclosed container to the manifold.

In an embodiment, the enclosed container further includes a plurality of lid magnets, disposed between the base and the bottom lid, and the plurality of lid magnets magnetically secure the top lid to the base and the bottom lid.

In an embodiment, the enclosed container further includes a plurality of hinge magnets, and half of the plurality of hinge magnets are disposed between the base and the bottom lid, half of the plurality of hinge magnets are disposed within the top lid, the plurality of hinge magnets disposed within the top lid having opposite magnetic polarity of the corresponding plurality of hinge magnets disposed between the base and the bottom lid, the top lid magnetically hinged and disposed about the base and the bottom lid in at least one position.

In an embodiment, the top lid is only magnetically connected to the base and the bottom lid, and the top lid is fully removable from the base and the bottom lid.

In an embodiment, the enclosed container may be connected to the manifold in at least one position such that the plurality of manifold through holes aligns with the plurality of bottom lid through holes and the plurality of base through holes, allowing cosmetic material to be dispensed from the cartridge into to the compact.

In an embodiment, each bottom lid through hole has a duckbill valve, allowing cosmetic material to be dispensed from the cartridge through the duckbill valve into the enclosed container, and preventing cosmetic material from flowing out of the enclosed container.

In an embodiment, the dispensing assembly further includes: a cartridge gear, connected to a first end of the cartridge; a motor gear, rotatably connected to the cartridge gear; and a motor, connected to the motor gear wherein rotation of the motor drives rotation of the motor gear, the cartridge gear, and the first end of the cartridge; an optical encoder, disposed adjacent to at least one of the set consisting of the cartridge gear and the motor gear, and the circuitry dispenses a quantity of cosmetic material from cartridge and into the receiving area, by detecting the position of at least one of the set consisting of the cartridge gear and the motor gear with the optical encoder, and controlling the direction and magnitude of rotation of the motor to rotate the first end of the cartridge.

In an embodiment, the cartridge gear further includes: a plurality of cartridge gear slots, and the optical encoder detects the position of the cartridge gear by detecting the cartridge gear slots during rotation of the cartridge gear.

In an embedment, the circuitry stores information of a quantity of cosmetic material remaining in a cartridge based on the total number of cartridge gear slots detected to rotate since the cartridge was inserted into the dispensing assembly.

In an another embodiment, a method is provided, implemented by the apparatus for dispensing cosmetic material. The method includes receiving and storing, at a memory, dispensing information which includes the specified amount of the cosmetic material to be dispensed for each cartridge disposed in the dispensing assembly to achieve a specified single use of a cosmetic application; and obtaining, by circuitry of the apparatus, the dispensing information from the memory and controlling the dispensing assembly to dispense the cosmetic material from each cartridge disposed in the dispensing assembly into the receiving area according to the one or more specified amounts included in the dispensing information.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein.

DETAILED DESCRIPTION OF THE EMBODIMENTS

Figure 1:
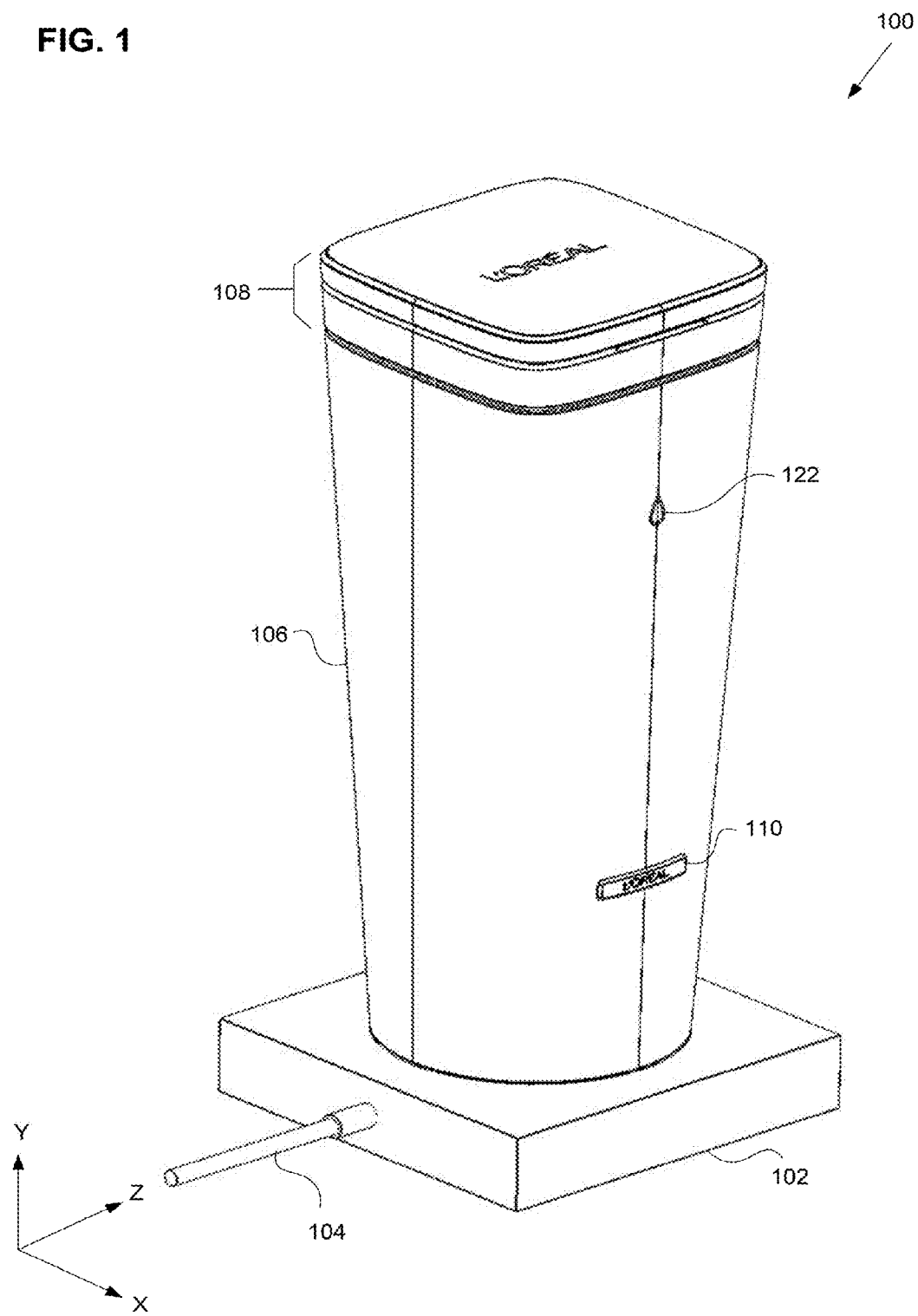
FIG. 1 is an overall perspective view of a cosmetic dispensing device, or a cosmetic dispenser, according to one example.

In the drawings, like reference numerals designate identical or corresponding parts throughout the several views. Further, as used herein, the words "a", "an" and the like generally carry a meaning of "one or more", unless stated otherwise.

Referring now to the drawings, wherein like reference numerals designate identical or corresponding parts throughout the several views.

Selecting cosmetic formulations, and component cosmetic materials to formulate cosmetic formulations, is a common activity often relying on subjective decision making and manual input. There are a wide variety of available cosmetic materials, and countless combinations and permutations of possible cosmetic formulations.

For each occasion where cosmetic formulations are used, subjective decisions are often made by an end user of cosmetics to produce satisfactory cosmetic formulations. Outcomes are generally the result of experimentation, perhaps requiring multiple iterations to produce a satisfactory outcome. Partly due to limited awareness of specific traits of the base cosmetic materials and necessary proportions, resulting cosmetic formulations may lack precision. The repeatability of producing a specific cosmetic formulation is thus difficult to accomplish. The below embodiments address these problems in the conventional art. FIG. 1 is an overall perspective view of a cosmetic dispensing device 100, or a cosmetic dispenser, according to one example. The visible portion of the cosmetic dispenser 100 includes a base 102 connected to a power cord 104. The base 102 provides a support for the dispenser body 106. A compact 108 is disposed above the dispenser body 106, a power button 110 may be disposed partly within the dispenser body 106 such that the dispenser body 106 secures placement of the power button 110, and an indicator light and button 122 may be disposed partly within the dispenser body 106 such that the dispenser body 106 secures placement of the indicator light and button 122. The indicator light and button 122 may be a mechanical or capacitive touch-type button.

Figure 2:
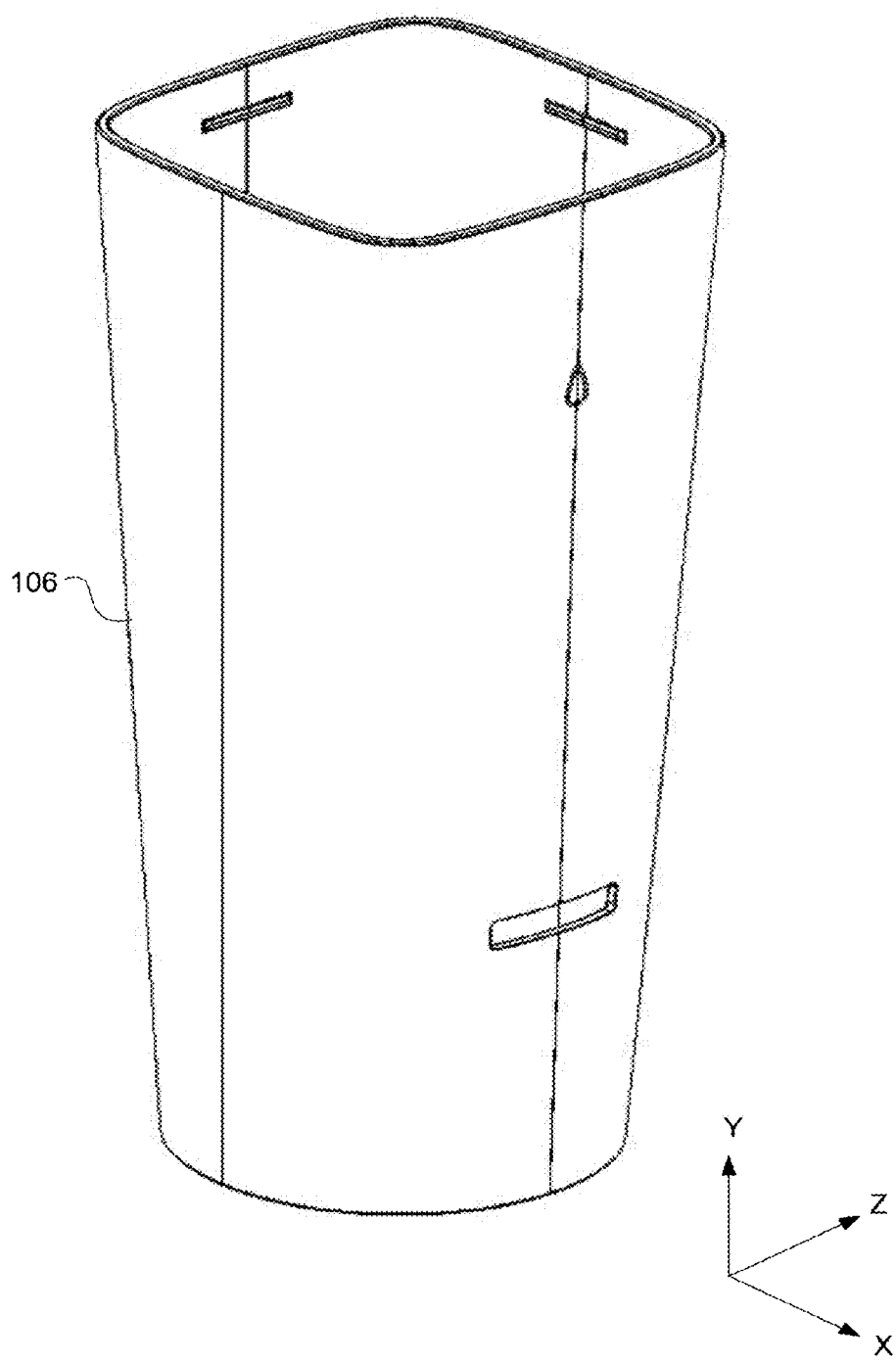
FIG. 2 is a perspective view of a dispenser body, according to one example.

FIG. 2 is a perspective view of the dispenser body 106, according to one example. The dispenser body 106 is a hollow, thin-walled container that serves as a cover for much of the components of the cosmetic dispenser 100. In this example the dispenser body 106 has a first end at the top with an approximately square cross section with rounded corners, while a second end at the bottom has a circular cross section. The dispenser body 106 may provide a base for the compact 108, or other components that serve as a base for the compact 108. The dispenser body 106 may also include a mounting point for the power button 110 and a mounting point for the indicator light and button 122.

Figure 3:
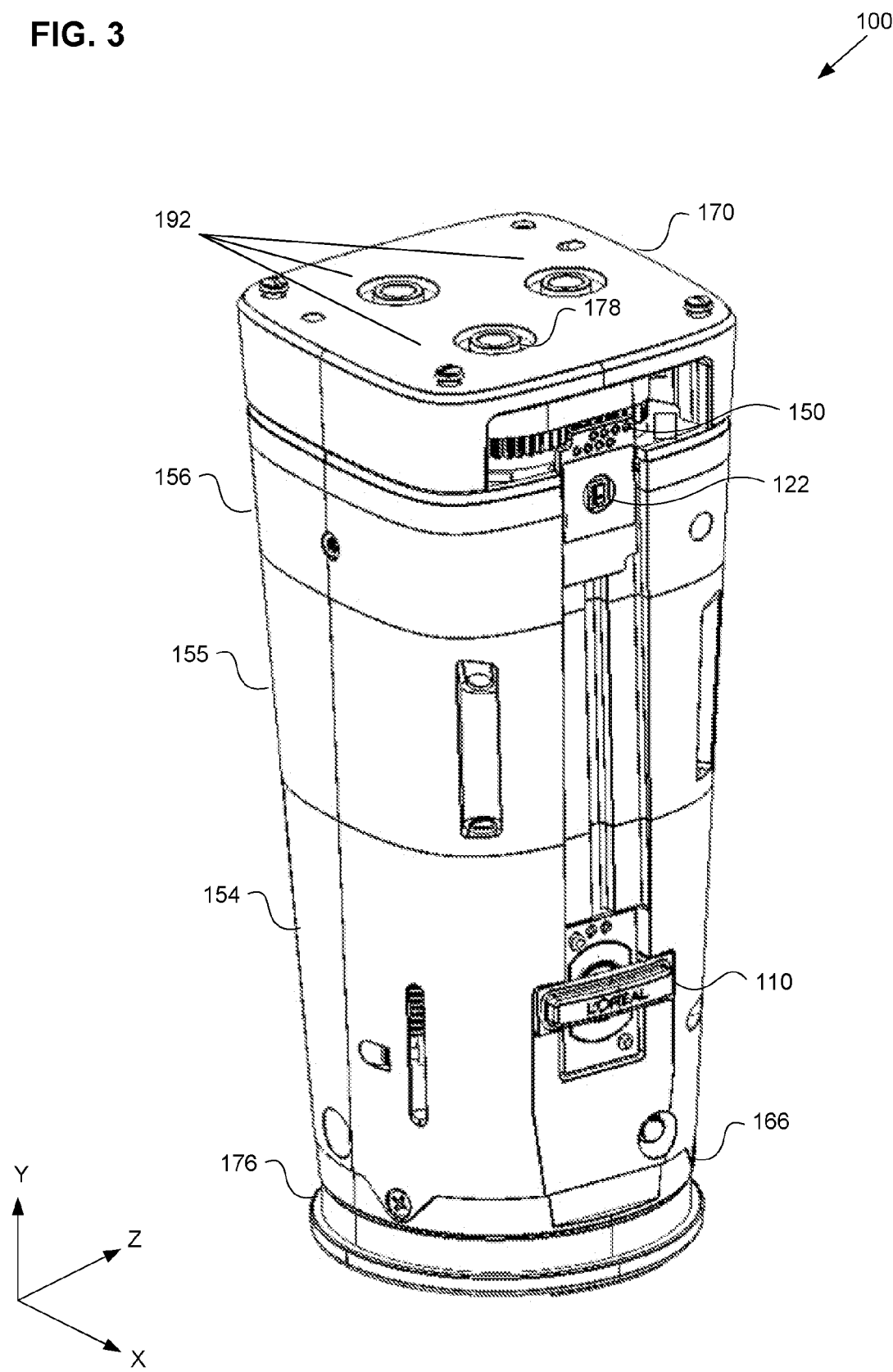
FIG. 3 is a perspective view of the cosmetic dispenser with the dispenser body removed, according to one example.

FIG. 3 is a perspective view of the cosmetic dispenser 100 with the dispenser body 106 removed, according to one example. The power button 110, the indicator light and button 122, a controller 150, a bottom plate 166, an inductive plate 176, and a gearhousing 170 are visible in this view, as are a lower body section 154, a middle body section 155, and an upper body section 156. The power button 110 is electrically connected to the controller 150.

Figure 4A:
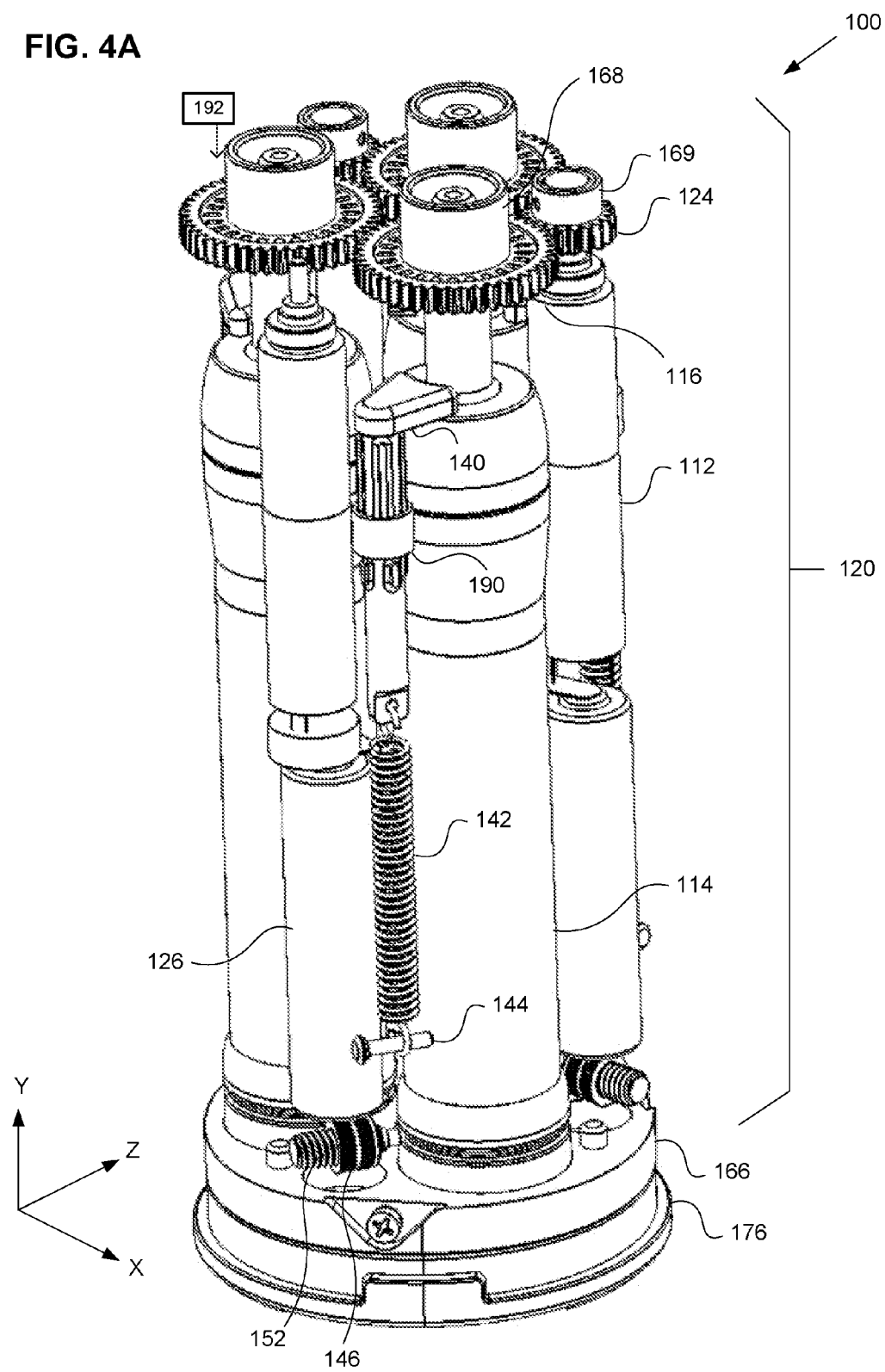
FIG. 4A is a perspective view of internal components of the cosmetic dispenser, according to one example.

The controller 150 includes circuitry for distributing power received through the power cord 104, controlling one or more motors 112 to dispense cosmetic material, detecting readings of an optical encoder 192 which is disposed on an inner surface of gearhousing 170 above each of the gears 116 as indicated in FIGS. 3 and 4A, charging one or more batteries 126, operating any indicators such as the indicator light and button 122, chimes, or other audiovisual signals, sensors such as for detecting availability status, type, and quantity of cosmetic material, and communicating wirelessly with external devices, including circuitry to send and receive signals and data, for example through smart phones and other wireless devices, using a variety of communication protocols, such as Radio Frequency (RF), Bluetooth, Wi-Fi, or cellular.

The inductive plate 176 supports the bottom plate 166, aside from the base 102 and the power cord 104, the remainder of the cosmetic dispenser 100 is disposed atop the bottom plate 166. The gearhousing 170 is disposed above, is connected to, and provides support to internal components of the cosmetic dispenser 100 that are further described by FIG. 4 through FIG. 9B. Further, the gearhousing 170 includes a plurality of gearhousing cartridge holes 178, one for each cartridge 114 in the cosmetic dispenser 100. A nozzle 160 of each cartridge 114 is disposed inside one of the gearhousing cartridge holes 178. Various additional substructures and covers may be disposed between the internal components of the cosmetic dispenser 100 and the dispenser body 106.

For example, the upper body section 156 is disposed above the middle body section 155, and the lower body section 154 disposed below the middle body section 155. When connected, the dispenser body 106 attaches to outside of at least one of the lower body section 154, the middle body section 155, and the upper body section 156. The bottom plate 166 is disposed below and connected to the lower body section 154.

Figure 4B:
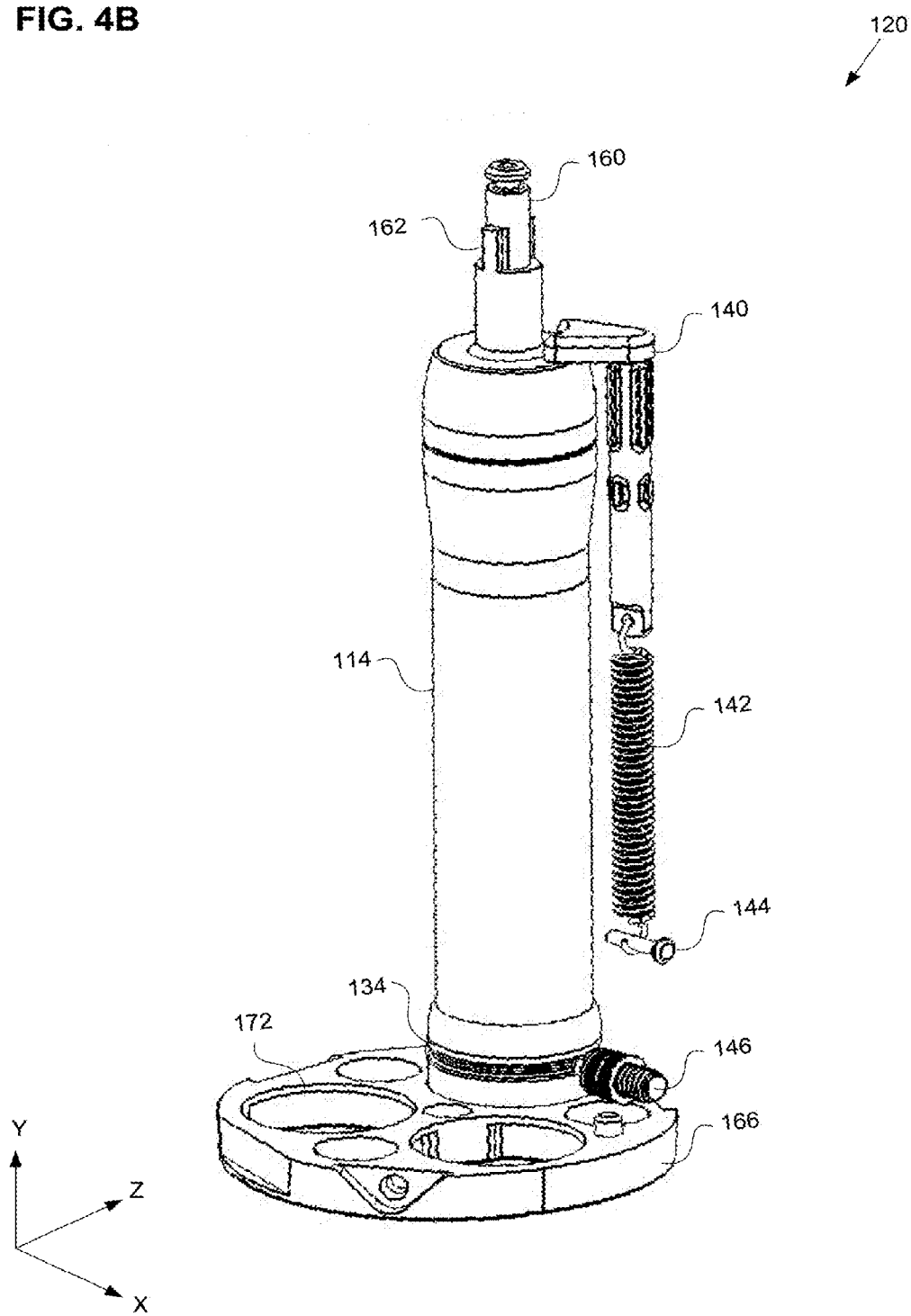
FIG. 4B is a perspective view of internal components of the cosmetic dispenser, according to one example.

FIG. 4A and FIG. 4B are perspective views of internal components of the cosmetic dispenser 100, according to one example. The internal assembly includes a plurality of dispensing assemblies 120, disposed above the bottom plate 166 and the inductive plate 176. Each dispensing assembly 120 comprises a cartridge 114, a cartridge gear 116, a motor 112, a motor gear 124, an ejector 140, an ejector index ring 190, an ejector spring 142, an ejector spring pin 144, a detent plunger 146, and a detent spring 152. The controller 150 controls the operation of each of the dispensing assemblies 120. The cosmetic dispenser 100 includes at least one dispensing assembly 120. The examples described herein contain three dispensing assemblies 120, though a person having ordinary skill in the art will recognize that a cosmetic dispenser 100 may have any number of dispensing assemblies 120.

Further, a plurality of batteries 126 inside the cosmetic dispenser 100 are electrically connected to the plurality of dispensing assemblies 120 to provide electrical power for the operation of the controller 150, the dispensing assembly 120, the motor 112, and various indicators, such as the indicator light and button 122 (further described in FIG. 3), chimes, and other audiovisual signals.

The controller 150 and a connected device 300 (shown in FIG. 14) allow a user to operate the cosmetic dispenser 100 wirelessly. Cosmetic material formulation and recipe commands to the controller 150 may be received from the connected device 300, such as a smart phone, tablet, or personal computer, configured to communicate with the cosmetic dispenser 100. Further, dispensing of cosmetic material may also be triggered by the user by touching the indicator light and button 122 on the cosmetic dispenser 100.

The cartridge 114 also has a cartridge key 162 disposed on or near the nozzle 160, is connected near a first end to the cartridge gear 116, is connected near a second end to the bottom plate 166, with a motor gear 124 connected to the motor 112, and the motor gear 124 drivingly connected to the cartridge gear 116. The cartridge 114 and the cartridge gear 116 are held in position by the gearhousing 170 (shown in FIG. 3). The cartridge 114 may be disposed inside the cosmetic dispenser 100, and secured in place by the ejector 140 connected to an ejector spring 142, the ejector spring pin 144 connected at a first end to the ejector spring 142 and rigidly connected at a second end to an inside surface of at least one of the dispenser body 106, the lower body section 154, the middle body section 155, the upper body section 156, and other internal structure. The dispensing assembly 120 further includes an ejector index ring 190 (shown in FIG. 4A) to guide the movement of the ejector 140 within the cosmetic dispenser 100 during insertion and removal of the cartridge 114, with the ejector index ring 190 disposed against the inside surface of at least one of the dispenser body 106, the lower body section 154, the middle body section 155, and the upper body section 156 to provide a guide for the movement the ejector 140.

Additionally, a detent plunger 146 may be disposed substantially perpendicularly to a longitudinal axis of the cartridge 114 and connected near the second end of the cartridge 114, providing a lateral pressure to a circumferential groove circumferential groove 134 of the cartridge 114, keeping the cartridge 114 in place along the vertical Y-axis, counteracting an opposite force applied by tension to the cartridge 114 by the ejector 140, the ejector spring 142, and an ejector spring pin 144. The ejector 140 is disposed within the cosmetic dispenser 100 and may move substantially parallel to the cartridge 114, and is connected to the ejector spring 142 that is further connected to the ejector spring pin 144. As the cartridge 114 is inserted into the cosmetic dispenser 100, an edge of the ejector 140 contacts an edge near the first end of the cartridge 114. The ejector 140 applies a pressure to the cartridge 114 as the ejector spring 142 stretches with the increasing distance between the stationary ejector spring pin 144 and the ejector 140, as the ejector 140 moves with the cartridge 114 further into the cosmetic dispenser 100. Once the cartridge 114 is inserted to the point that a first end of the detent plunger 146 makes contact with the circumferential groove 134 of the cartridge 114, the motion of the cartridge 114 along the Y-axis is restricted, holding the cartridge 114 in place.

The detent plunger 146 is a mechanism for holding the cartridge 114 in place. The detent plunger 146 moves along an axis substantially perpendicular to that of the major axis of the cartridge 114. A first end of the detent plunger 146 is disposed to make contact with the cartridge 114. A second end is connected to a first end of a detent spring 152, the second end of the detent spring 152 in contact with an inside surface of at least one of the dispenser body 106, the lower body section 154, the middle body section 155, the upper body section 156, or other internal structure. Insertion of the cartridge 114 into the cosmetic dispenser 100 displaces the detent plunger 146 against the detent spring 152, compressing the detent spring 152. Because the contour of the cartridge 114 varies over the length of the cartridge 114, the detent plunger 146, and the detent spring 152 are displaced by varying amounts depending on the position of the cartridge 114 relative to the cosmetic dispenser 100. At a point where the detent plunger 146 contacts the circumferential groove 134 of the cartridge 114, the first end of the detent plunger 146 is able to lock the cartridge 114 in place due to pressure of the detent spring 152 and the geometric relationship between the detent plunger 146 and the circumferential groove 134.

Further, the cartridge 114 is inserted into the cosmetic dispenser 100 through a cartridge through hole 172 of the bottom plate 166. The cartridge through hole 172 has a base key cutout 165 (FIG. 7A) shaped to correspond to the base key 164 such that as the base key 164 and the base key cutout 165 make contact, the cartridge 114 cannot rotate relative to the bottom plate 166. The cartridge 114 is also shaped to fit into the bottom plate 166 and the cartridge gear 116 in a specific orientation. In the position where the cartridge 114 is fully inserted into the cosmetic dispenser 100 and locked in place by the detent plunger 146, the cartridge 114 is seated against the cartridge gear 116. Additionally, the cartridge gear 116 has a collar 168 portion that is rotatably connected to the gearhousing 170, restricting movement of the cartridge gear 116 such that the cartridge gear 116 can rotate about a longitudinal axis but may not move axially or otherwise, and supporting the position of each of the cartridge gears 116 and motor gears 124. Similarly, the motor gear 124 has a motor gear collar 169 portion that is rotatably connected to the gearhousing 170, restricting movement of the motor gear 124 such that the motor gear 124 can rotate about a longitudinal axis but may not move axially or otherwise, preserving the relationship between the cartridge gear 116 and the motor gear 124 such that rotary motion of the motor gear 124 results in rotary motion of the cartridge gear 116 at a fixed ratio.

The motor gear 124 may be a spur gear that includes a key cutout 163 (FIG. 6) that fits the cartridge key 162 of the cartridge 114, as described by FIG. 4B.

Figure 5:
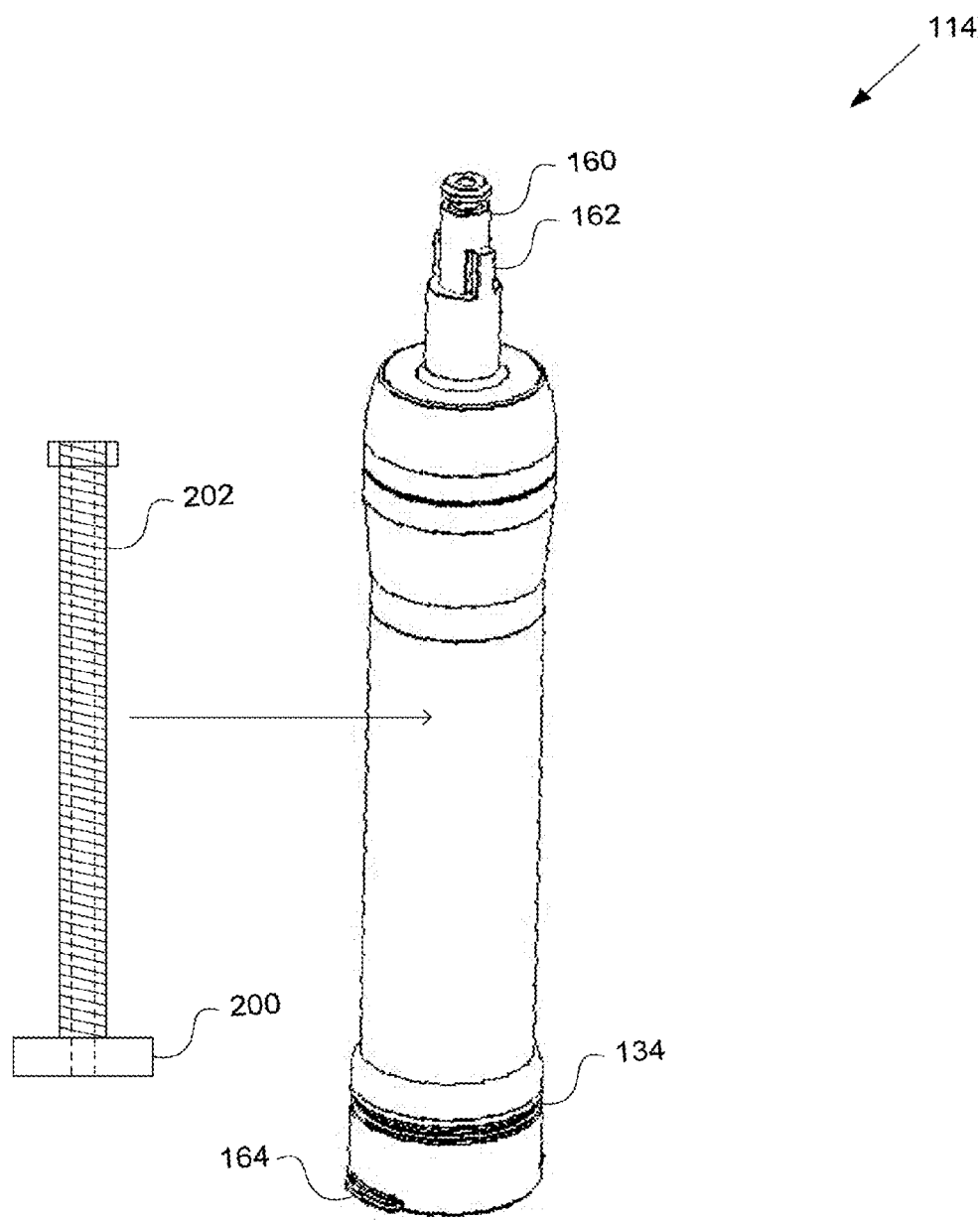
FIG. 5 is a perspective view of a cartridge, according to one example.

FIG. 5 is a perspective view of the cartridge 114, according to one example. The cartridge 114 has a round, cylindrical body and a nozzle 160 at a first end. The nozzle 160 is further disposed near a cartridge key 162. The cartridge key 162 fits inside the opening of the cartridge gear 116, corresponds to the shape of the key cutout 163 of the cartridge gear 116, and locks the rotational motion of the portion near a first end of the cartridge 114 with that of the cartridge gear 116. As the cartridge gear 116 is driven by the motor gear 124 and the motor 112. A second end of the cartridge 114 includes a base key 164. The base key 164 fits inside the base key cutout 165 of the bottom plate 166, secures the second end of the cartridge 114 to the bottom plate 166, and prevents rotational motion of the second end of the cartridge 114 relative to the bottom plate 166. Since the first end of the cartridge 114 is secured to the motion of the cartridge gear 116, actuation of the motor 112 rotates the motor gear 124 and drives the cartridge gear 116, thereby opening and closing the nozzle 160 of the cartridge 114. The first and second ends of the cartridge 114 may rotate relative to one another.

The cartridge gear 116 actuates the nozzle 160 of the cartridge 114 that is attached to a hollow cartridge lead screw 202 within the cartridge 114. Rotation of the cartridge lead screw 202 proportionately displaces a cartridge piston 200 that forces an amount of cosmetic material through the cartridge lead screw 202 and out the nozzle 160 of the cartridge 114. The amount of cosmetic material released during an opening and closing operation of the nozzle 160 is a function of the displacement of the cartridge lead screw 202, which is dependent upon the rotational displacement of the cartridge gear 116. Rotation of the motor 112 rotates the respective motor gear 124 and the cartridge gear 116. The controller 150 detects the relative motion of the cartridge gear 116 using the optical encoder 192 to count a number of cartridge gear slots 148 that pass the optical encoder 192 as the cartridge gear 116 rotates has depicted in FIG. 4A), and the direction of rotation of the cartridge gear 116. A specific unit of measure of cosmetic material is a dose unit dose unit 118.

An amount of cosmetic material is released from the cartridge 114 through the nozzle 160 by a first rotational motion of the first end with respect to the second end of the cartridge 114. Rotational motion of the first end of the cartridge 114 in a second direction, opposite of the first rotational motion, may close the nozzle 160 of the cartridge 114.

The cartridge gear 116 actuates the nozzle 160 of the cartridge 114 that is attached to a hollow cartridge lead screw 202 within the cartridge 114. Rotation of the cartridge lead screw 202 proportionately displaces a cartridge piston 200 that forces an amount of cosmetic material through the cartridge lead screw 202 and out the nozzle 160 of the cartridge 114. The amount of cosmetic material released during an opening and closing operation of the nozzle 160 is a function of the displacement of the cartridge lead screw 202, which is dependent upon the rotational displacement of the cartridge gear 116. Rotation of the motor 112 rotates the respective motor gear 124 and the cartridge gear 116. The controller 150 detects the relative motion of the cartridge gear 116 using the optical encoder 192 to count a number of cartridge gear slots 148 that pass the optical encoder 192 as the cartridge gear 116 rotates, and the direction of rotation of the cartridge gear 116. A specific unit of measure of cosmetic material is a dose unit dose unit 118.

In one example, the pitch of the cartridge lead screw 202 is about 1 mm, with one full rotation of the cartridge lead screw 202 dispensing about 1 mL of cosmetic material from the cartridge 114.

In another example, due to the shape of the cartridge key 162 of the cartridge 114 the circumferential groove 134 may be a notch or a groove about a portion of the circumference of the cartridge 114, rather than extend fully around the perimeter of the cartridge 114 to secure the cartridge 114 to the detent plunger 146 in substantially the same manner.

Figure 6:
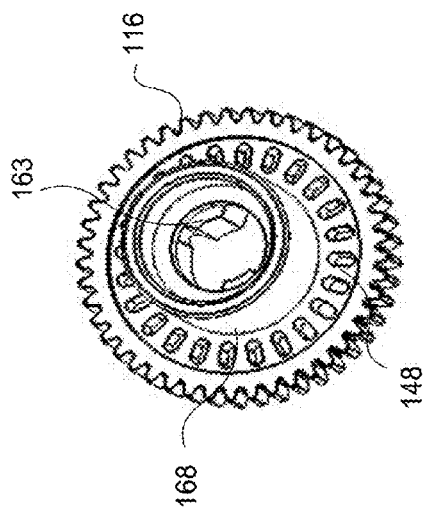
FIG. 6 is a perspective view of a cartridge gear, according to one example.

FIG. 6 is a perspective view of the cartridge gear 116, according to one example. The cartridge gear 116 may be a spur gear that includes a key cutout 163 that corresponds to the shape of the cartridge key 162 of the cartridge 114. The cartridge gear 116 may further have a collar 168 that rotatably connects to an inside surface of the gearhousing 170 to align and support the position of the cartridge gear 116 and the corresponding motor gear 124. The cartridge gear 116 may have a plurality of cartridge gear slots 148 for use with the optical encoder 192 to detect angular position of the cartridge gear 116 and the cartridge lead screw 202.

Figure 7A:
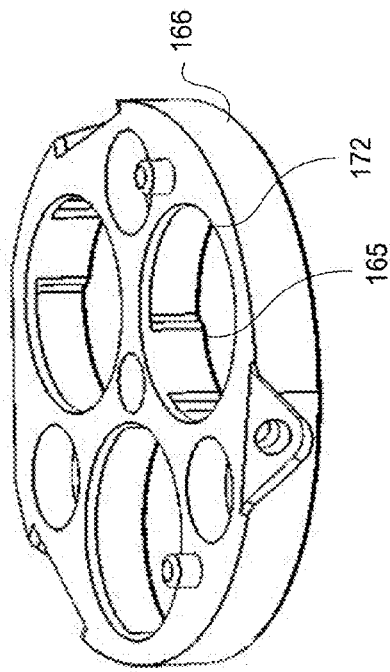
FIG. 7A is a perspective view of a bottom plate, according to one example.

FIG. 7A is a perspective view of the bottom plate 166, according to one example. The bottom plate 166 is connected to the dispenser body 106 and/or the lower body section 154, restrains the plurality of cartridges 114 disposed inside the cosmetic dispenser 100, and connects the cosmetic dispenser 100 to the inductive plate 176 disposed below the bottom plate 166.

The bottom plate 166 has a plurality of cartridge through holes 172 to allow for the insertion, removal, and securement of the plurality of cartridges 114. Each cartridge through hole 172 includes a base key cutout 165, and the shape of the base key cutout 165 corresponds to the shape of the base key 164 of each cartridge 114 to prevent rotational motion of the second end of the cartridge 114, the portion in contact with the bottom plate 166, when the cartridge 114 is installed in the cosmetic dispenser 100.

Further, the bottom plate 166 has contact pins 174 (shown in FIG. 7B) that contact the inductive plate, providing electricity to the bottom plate 166, allowing the cosmetic dispenser 100 to charge the plurality of batteries 126 through contact or induction.

Figure 7B:
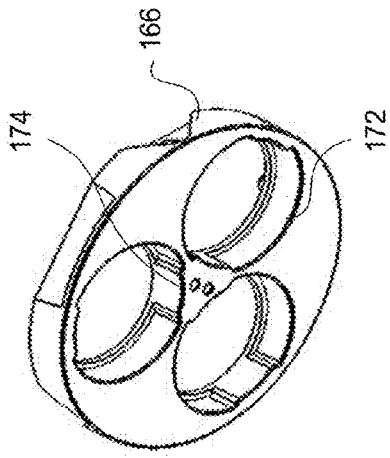
FIG. 7B is a perspective view of the bottom plate, viewed from the bottom, according to one example.

FIG. 7B is a perspective view of the bottom plate 166, viewed from the bottom, according to one example. The bottom plate 166 includes three cartridge through holes 172 disposed within the plate, and contact pins 174. When the bottom plate 166 is disposed within the cosmetic dispenser and upon the base 102, the contact pins 174 can conduct electricity from the base 102 to the bottom plate 166. The bottom plate 166 can then inductively charge the plurality of batteries 126 disposed above the bottom plate 166.

Figure 8:
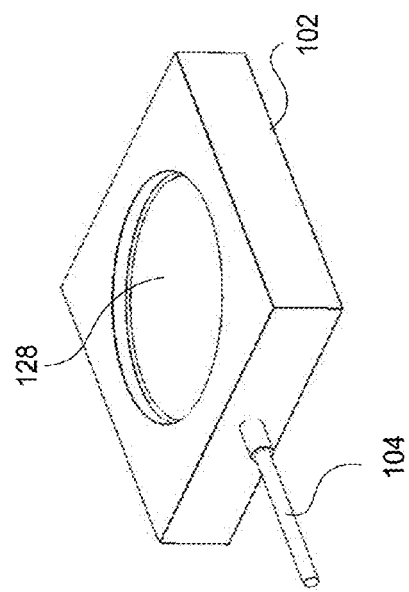
FIG. 8 is a perspective view of a base, according to one example.

FIG. 8 is a perspective view of the base 102, according to one example. A power cord 104 is connected at a first end to the base 102. The power cord 104 is connected at a second end to a power source (not shown), providing power for the operation of the cosmetic dispenser 100 and for charging the plurality of batteries 126. The base 102 includes a base indentation 128 for placement of the inductive plate 176 and other portions of the cosmetic dispenser 100. The base indentation 128 may have the ability to inductively charge the plurality of batteries 126 using power supplied by the power cord 104. Further, it may also charge the cosmetic dispenser 100 through contact pins 174 disposed inside the bottom plate 166 when the bottom plate 166 is disposed within the base indentation 128.

Figure 9A:
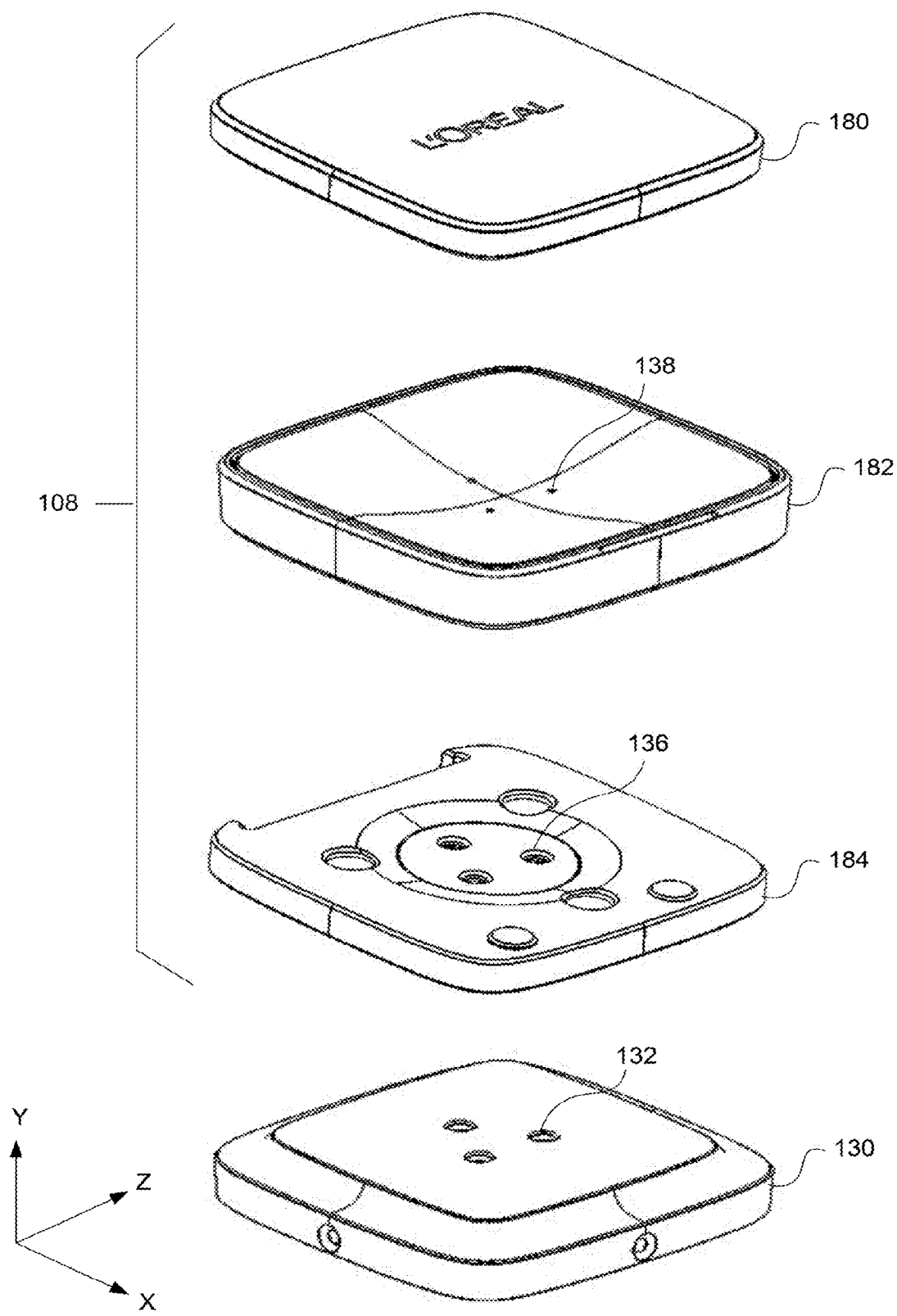
FIG. 9A is an exploded perspective view of a compact, disposed above a manifold, according to one example.

FIG. 9A is an exploded perspective view of the compact 108, disposed above a manifold 130, according to one example. The compact 108 includes a top lid 180, a compact base 182, and a bottom lid 184. The top lid 180 is disposed above the compact base 182, which is disposed above or within the bottom lid 184. The top lid 180 is secured to the compact base 182 by magnets, as described further by FIG. 9B. The compact base 182 includes a plurality of compact base through holes 138. In this example, there is one compact base through hole 138 for each cartridge 114 in the cosmetic dispenser 100. The bottom lid 184, having a plurality of bottom lid through holes 136, is disposed underneath the compact base 182. In this example there is one bottom lid through hole 136 for each cartridge 114 in the cosmetic dispenser 100, and the bottom lid 184 is disposed such that each bottom lid through hole 136 corresponds to and is connected to a compact base through hole 138 of the compact base 182.

The compact 108 is connected to the manifold 130, the manifold 130 connected to and disposed above the gearhousing 170, further disposed within the dispenser body 106 of the cosmetic dispenser 100, and the compact 108 is disposed above both the manifold 130 and the dispenser body 106. The manifold 130 includes one manifold through hole 132 for each cartridge 114 in the cosmetic dispenser 100, and the manifold 130 is disposed such that each manifold through hole 132 corresponds to and is connected to a compact base through hole 136 of the bottom lid 184. Further, each manifold through hole 132 of the manifold 130 corresponds to and is disposed above a gearhousing cartridge hole 178 of the gearhousing 170, providing a passage by which cosmetic material can be dispensed from the nozzle 160 of each cartridge 114 through the manifold 130, the bottom lid 184, and into the compact base 182.

The compact 108 may have a form such that there is only one orientation by which the compact 108 can connect to the cosmetic dispenser 100. In another example, it may be that the form of the compact 108 can connect to the compact 108 in more than one orientation.

Further, cosmetic material dispensed into the compact 108 may be prevented from flowing back out by use of a one way duckbill valve 194 (not shown) disposed within each of the compact base through holes 136 in the bottom lid 184 of the compact 108.

Figure 9B:
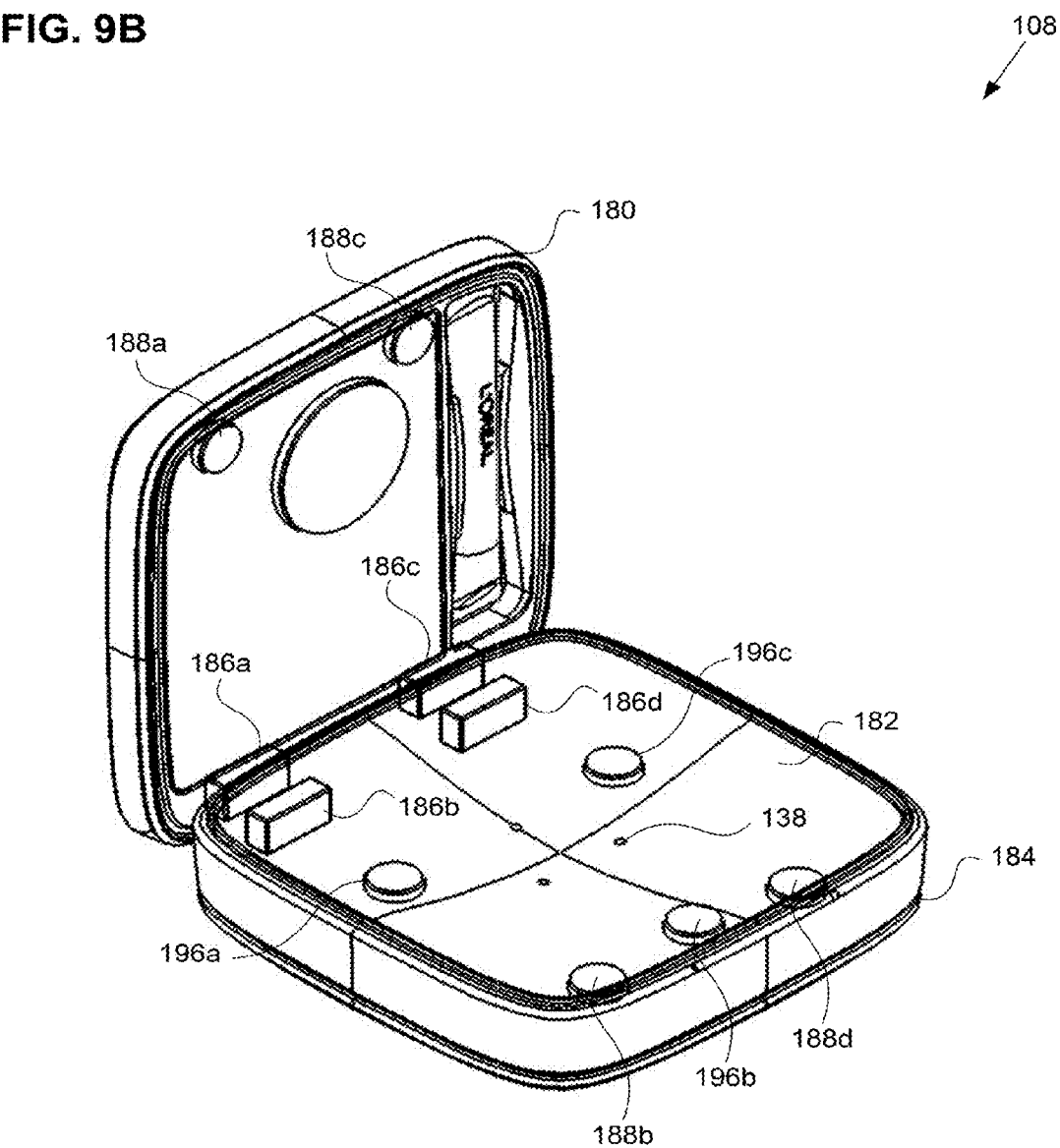
FIG. 9B is a perspective view of the compact in an open position, according to one example.

FIG. 9B is a perspective view of the compact 108 in an open position, according to one example. The compact 108 includes a top lid 180, a compact base 182, a bottom lid 184, a plurality of hinge magnets 186a, 186b, 186c, and 186d, a plurality of lid magnets 188a, 188b, 188c, and 188d, and a plurality of mounting magnets 196a, 196b, and 196c.

In one example, the compact base 182, the plurality of mounting magnets 196a-196c, a first half of the plurality of lid magnets 188b and 188d, and a first half the plurality of hinge magnets 186b and 186d, are disposed within the bottom lid 184, with the compact base 182 disposed above. The plurality of mounting magnets 196a-196c are disposed to magnetically connect the compact 108 to the cosmetic dispensing device 100, for example by connecting to the manifold 130 (FIG. 9A). The manifold 130, or portions of the surface of the manifold 130, may be formed of a ferrous material or contain corresponding magnets to magnetically attach to the plurality of mounting magnets 196a-196c.

A second half of the plurality of lid magnets 188a and 188c are disposed within a side of the top lid 180, and a second half of the plurality of hinge magnets 186a and 186c are disposed within a side of the top lid 180. The hinge magnets 186b and 186d are disposed within a side of the bottom lid 184 such that they may be in contact with corresponding hinge magnets 186a and 186c in at least two planes, depending on a relative position between the top lid 180 and the bottom lid 184. The hinge magnets 186a and 186b have opposite magnetic polarity, as do the respective pairs of hinge magnets 186c and 186d, the lid magnets 188a and 188b, and the lid magnets 188c and 188d.

The plurality of 196 and the plurality of lid magnets 188a-188d may be disposed such that the plurality of bottom lid through holes 138 disposed in the compact base 182 are unobstructed to allow cosmetic material to flow from each of the cartridges 114 into the compact 108 as cosmetic material is dispensed.

In a case where the compact 108 is in an open position, the top lid 180 and the bottom lid 184 are positioned approximately in perpendicular planes, the hinge magnets 186a and 186c magnetically connected to the hinge magnets 186b and 186d, respectively. The magnetic force between each pair of the hinge magnets 186a and 186b and the hinge magnets 186c and 186d is sufficient to hold the top lid 180 in position relative to the bottom lid 184.

In a case where the compact 108 is in a closed position, the top lid 180 and the bottom lid 184 are positioned approximately in parallel planes, the hinge magnets 186a and 186c magnetically connected to the hinge magnets 186b and 186d, respectively, and the lid magnets 188a and 188c are disposed in corresponding positions, and magnetically connected with the lid magnets 188b and 188d, respectively, the magnetic connection between the pairs of hinge magnets 186a and 186b and the hinge magnets 186c and 186d, and between the pair of lid magnets 188a and 188b, and the pair of lid magnets 188c and 188d, sufficient to keep the top lid 180 connected to the bottom lid 184 in a closed position.

Since the top lid 180 is connected to the bottom lid 184 magnetically, the top lid 180 may be entirely removable from the bottom lid 184. Further, it may also be able to connect with the bottom lid 184 in a closed position in more than one orientation about the x-z plane, depending on the disposition of the plurality of the hinge magnets 186a-186d and the lid magnets 188a-188d within the top lid 180 and the bottom lid 184. Further, the top lid 180 may be able to pivot about the bottom lid 184, or vice versa, opening or closing about more than one axis, such as about the x-axis or the z-axis.

Alternatively, the plurality of mounting magnets 196a-196c may be substituted by one mounting magnet 196 of sufficient strength to secure the compact 108 to the cosmetic dispensing device 100.

Alternatively, the plurality of hinge magnets 186a-186d may be substituted by one hinge magnet 186a of sufficient strength in the top lid 180 and by one hinge magnet 186b of sufficient strength in the bottom lid 184 to secure one side of the top lid 180 to the bottom lid 184 with the compact 108 in an open or a closed position.

Alternatively, the plurality of lid magnets 188a-188d may be substituted by one lid magnet 188a of sufficient strength in the top lid 180 and by one lid magnet 188b of sufficient strength in the bottom lid 184 to secure one side of the top lid 180 to the bottom lid 184 with the compact 108 in a closed position.

Figure 10:
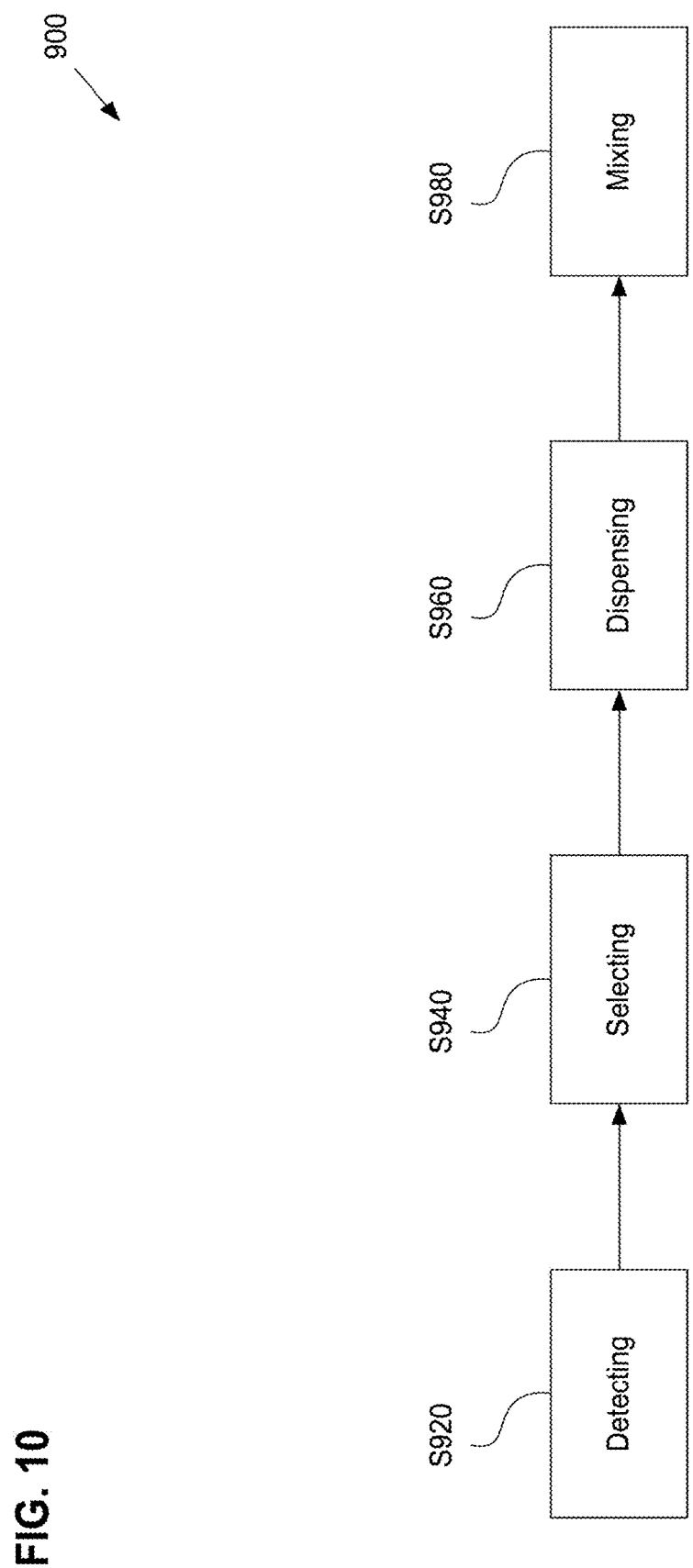
FIG. 10 is a diagram representing an example sequence of primary processes of a cosmetic formulation method 900, according to one example.

FIG. 10 is a diagram representing an example sequence of primary processes of a cosmetic formulation method 900, according to one example. The examples provided herein each have three cartridges, though the same process may be used by cosmetic dispenser 100 equipped with any number of cartridges 114. The cosmetic formulation method 900 includes a detecting process S920, a selecting process S940, and a dispensing process S960. An additional mixing process S980 may be performed by a user. The detecting processes S920, the selecting process S940, and the dispensing process S960 are performed by the cosmetic device 100 based on commands received from the controller 150, the controller 150 sending data to and receiving input from the user through the smart device 300 or by indicators on the cosmetic device 100 itself, as described in FIG. 3 and FIG. 4.

Figure 11:
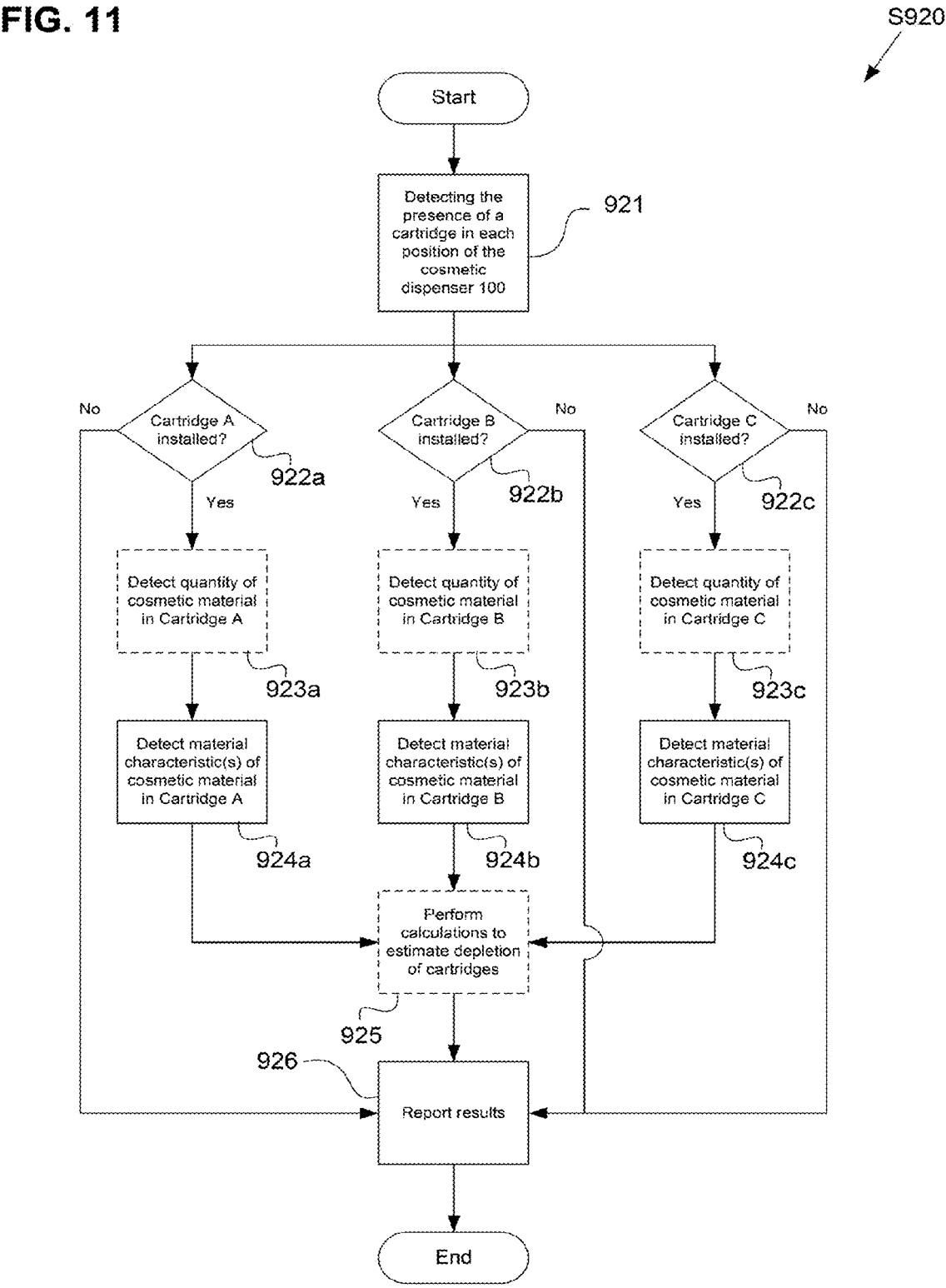
FIG. 11 is a process diagram representing an example a process of detecting cosmetic material in the cosmetic dispenser, according to one example.

FIG. 11 is a process diagram representing an example a process of detecting cosmetic material in the cosmetic dispenser 100, according to one example. S920 represents a process for detecting cosmetic material. The process S920 may include at least one of the steps of step 921 detecting removal and installation of a cartridge 114, step 922 detecting at least one material characteristic of the cartridge 114, an optional step 923 of detecting a quantity of cosmetic material in the cartridge 114, and an optional step 924 to calculate an estimated depletion of the cartridge(s) after a future dispensing operation is performed.

The optional step 923 of detecting a quantity of material in each of a plurality of cartridges 114 may include, for example, step 923*a* detecting a quantity of material of a cartridge A, step 923*b* detecting a quantity of material of a cartridge B, and step 923*c* detecting a quantity of material of a cartridge C, for example based on total net displacement (rotation) of the cartridge gear 116 detected by the optical encoder 192 since installation of each cartridge 114.

The optional step 924 of detecting at least one material characteristic in each of a plurality of cartridges 114 may include, for example, step 924*a* detecting at least one material characteristic of a cartridge A, step 924*b* detecting at least one material characteristic of a cartridge B, and step 924*c* detecting at least one material characteristic of a cartridge C. Material characteristics may include at least one from the set of consisting of color, texture, sheen, moisture, nutrient content, and chemical formulation. This detection may be performed based on a near field sensor disposed in the dispenser 100 which detects an RFID tag on the cartridge that stores information of the contents of the cartridge according to methods well understood in the art. Alternative methods of detection may be used such as bar code detection of a bar code printed on the cartridge, or detection using methods well understood in the art. The step of detecting the at least one material characteristic in each of the cartridges may be performed before the optional step of detecting the quantity of cosmetic material in each cartridge.

Further, process S920 may include optional step 926 for reporting information that may be derived from historical usage data, of the user or aggregated across groups of users, such as which cartridge 114 within the cosmetic dispenser 100 is anticipated to be depleted of cosmetic material first and by when.

Figure 12A:
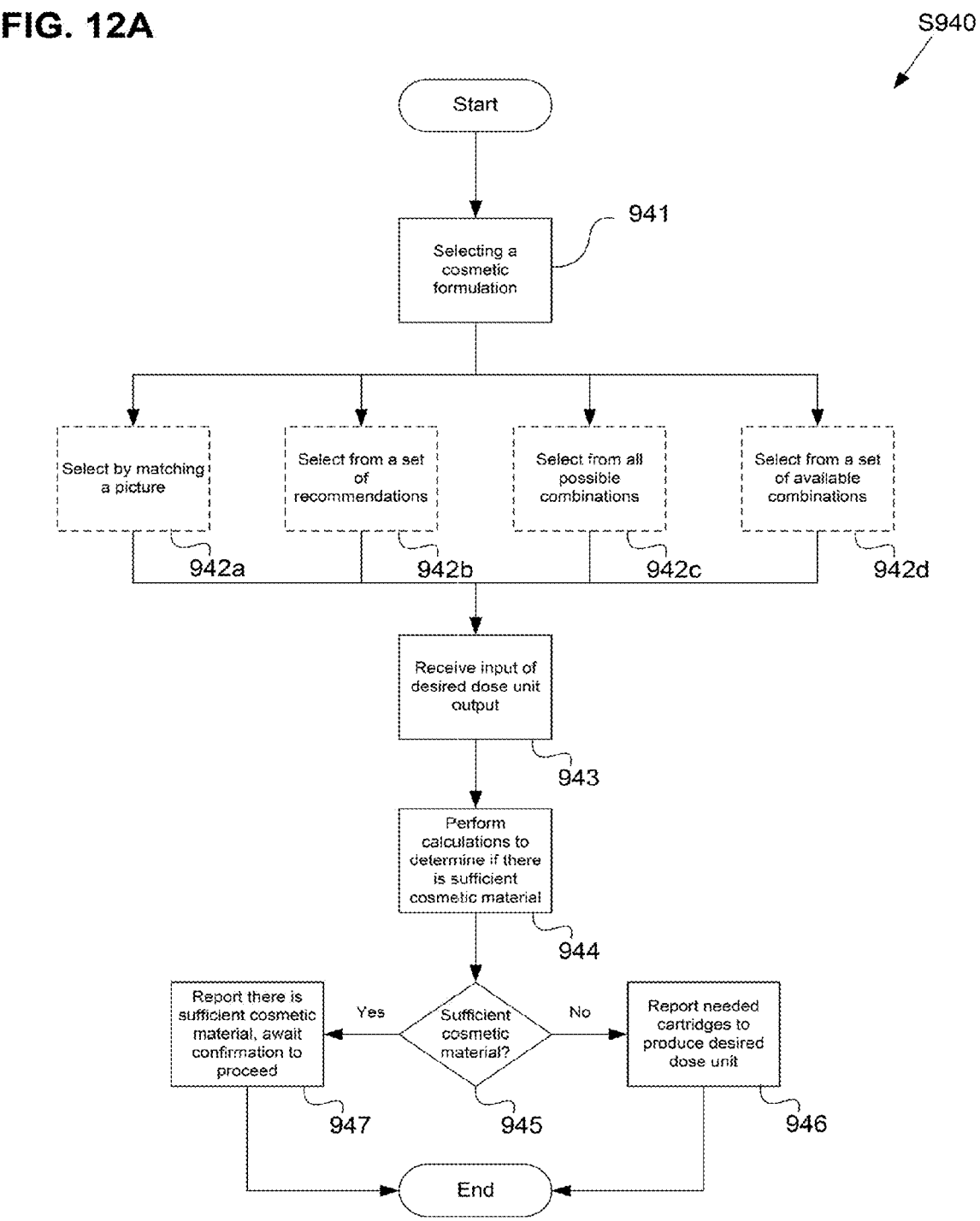
FIGS. 12A and 12B are process diagrams representing examples a process of selecting a cosmetic formulation, according to one example.

FIG. 12A is a process diagram representing an example a process S940 of selecting a cosmetic formulation, according to one example. S940 includes a process for selecting a cosmetic formulation. The process S940 includes steps of identifying combinations of cosmetic formulations possible based on the type and quantities of cosmetic materials present within the cosmetic dispenser 100, as established by the detecting process S920.

A step 942*d* may be based on a user selecting from a set of cosmetic formulations that are possible for the types and quantities of cosmetic material present within the cosmetic dispenser 100, or a step 942*c* allows the user to choose from a larger set of cosmetic material inventory 204 that is possible for types and quantities of cosmetic materials the cosmetic dispenser 100 is capable of using.

In another example, a step 943 of process S940 includes allowing a user to choose a desired dose unit 118. Varying the dose unit 118 can change the set of available cosmetic formulations from within the cosmetic dispenser 100 if a greater amount of one or more cosmetic materials is needed than is available to dispense a specific quantity of dose unit 118 for a specific cosmetic formulation.

For example, if cartridge A contains yellow cosmetic material, cartridge B contains red cosmetic material, and cartridge C contains green cosmetic material, and there is only one dose unit 118 of cartridge A remaining, the user would not be able to choose to dispense any combination of dose units 118 and cosmetic formulation that requires more than one dose unit 118 of yellow cosmetic material.

Further, the process S940 may include a step 942*a* for the user to select a cosmetic formulation based on matching of a photo, a step 942*b* for the user to select a cosmetic formulation based on recommendations, or selecting a cosmetic formulation based on another process. U.S. Pat. No. 8,634,640, describes a method for selecting a color from an image or picture in a camera or electronic device, and using color reference data to substantially match the color, and is hereby incorporated as reference in its entirety.

In another embodiment, a skin diagnosis (sometimes referred herein as a skin profile) may be performed for providing a recommended plurality of predetermined colors for the user to select based on an analysis of the user's skin features. The skin diagnosis determines an appropriate color for the user based on an imaging operation performed on the user's face. he Lancome Diagnos ABS, HR Skinscope, Biotherm Bluesmart, Kiehl's Skinprofiler V.0, CA Dermanalyzer, and the Vichy Vichyconsult.

For cosmetic formulations that are possible but not available based on the results of the detecting process S920, the cosmetic dispenser 100 may communicate to the user what cosmetic materials are necessary to dispense such cosmetic formulations.

In one example, in step 944 the user selects a dose unit 118 of a cosmetic formulation presently unavailable. Step 944 may determine what cosmetic materials, such as what type of cartridges 114 are needed to mix and dispense the selected cosmetic formulation.

In another example, step 944 may determine what additional cosmetic formulations may become available if a specific cartridge 114 is replaced with a full but otherwise identical cartridge 114.

In another example, step 944 may determine what additional cosmetic formulations may become available if a cartridge 114 is replaced with another cartridge 114 containing different cosmetic material.

Step 945 determines whether to proceed to step 947 to prompt the user to confirm and proceed with dispensing a cosmetic formulation or to proceed to step 946 to report what cartridge or cartridges 114 are needed to dispense the desired cosmetic formulation, based on the outcome of step 944.

Figure 12B:
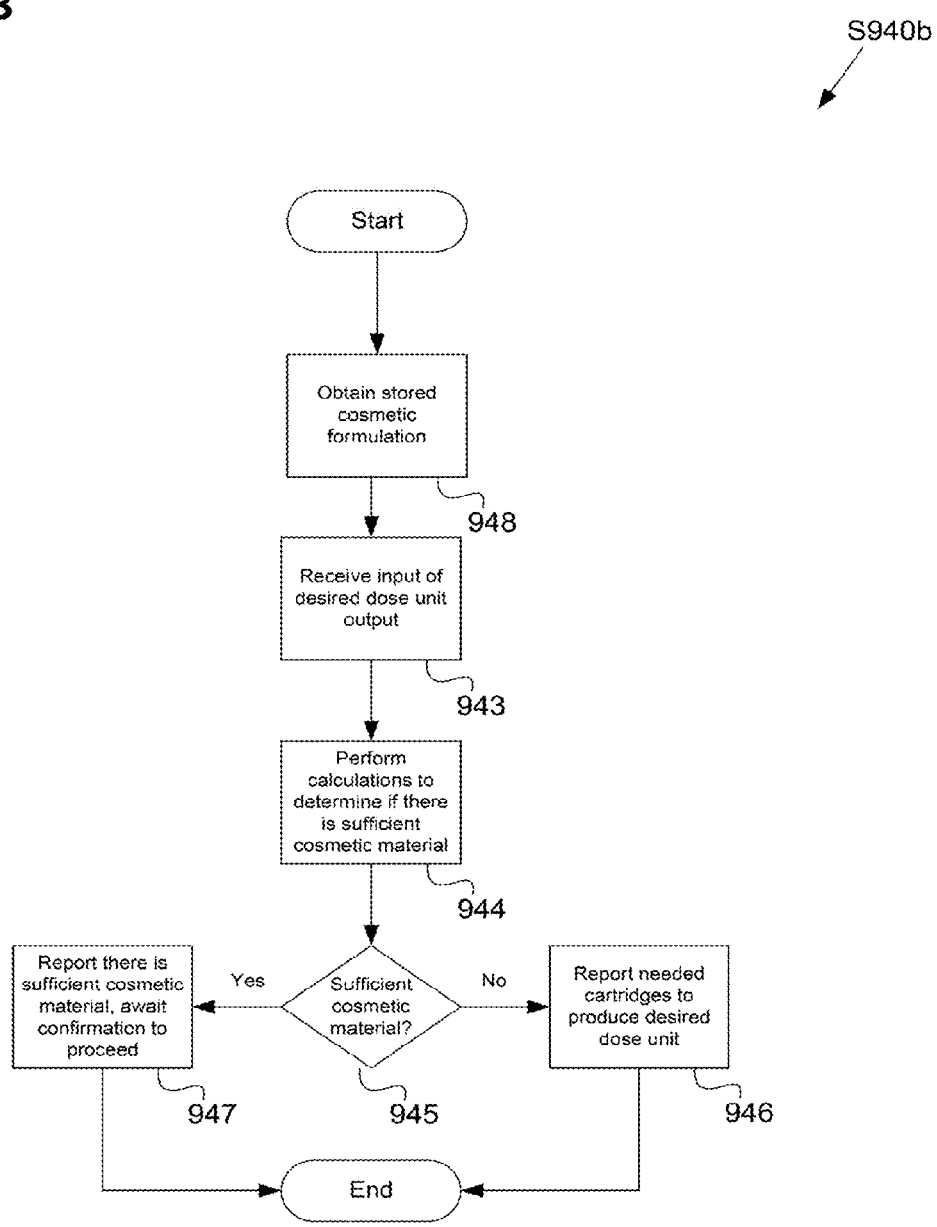

FIG. 12B shows an optional process S940b that is performed by the dispenser apparatus 100 alone after a cosmetic formulation has been previously received and is currently stored on the dispenser apparatus 100 in a step 948. The remaining steps 943 through 947 of S940b are identical to those of S940 described by FIG. 12A. The process of FIG. 12B may be performed without an existing connection being established between the dispenser apparatus 100 and device 300.

Figure 13:
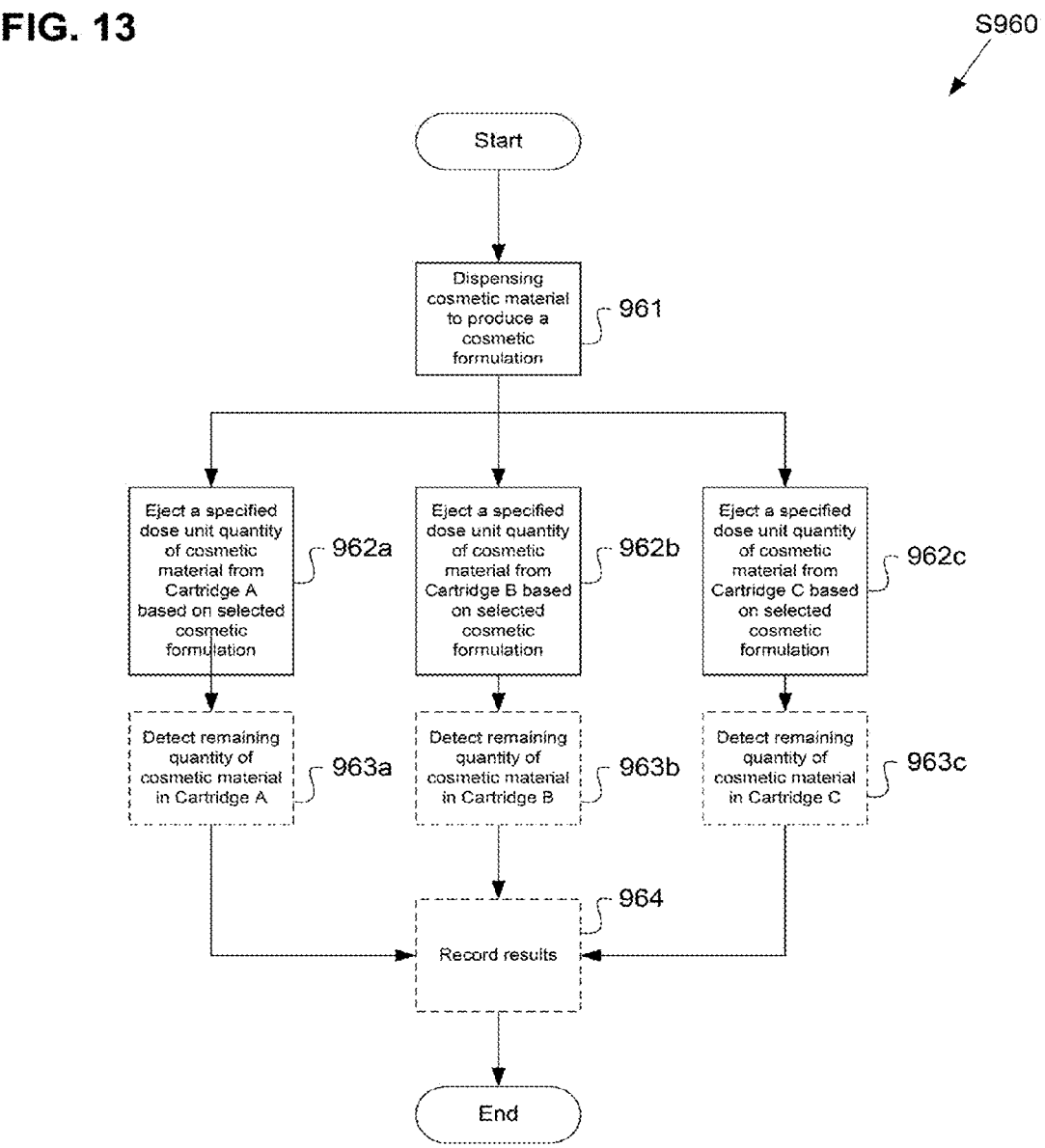
FIG. 13 is a process diagram representing an example a process of dispensing cosmetic material in the cosmetic dispenser, according to one example

FIG. 13 is a process diagram representing an example of a process S960 of dispensing cosmetic material in a cosmetic dispenser 100, according to one example. Step 961 represents a step for dispensing at least one dose unit of a cosmetic formulation. The process S960 includes steps 962a through 962c of ejecting a requested quantity of cosmetic material from at least one cartridge 114 to produce a cosmetic formulation selected by the user in process S940, such that the cosmetic formulation may be applied, transported in a container, or is otherwise available to the user. The process S960 includes optional steps 963a through 963c of detecting the remaining quantity of cosmetic material in each of the cartridges and optional step 964 of recording the results in a memory of the dispensing apparatus.

After the dispensing process S960 is completed, the user may perform the process S980 of mixing the released cosmetic material manually, producing the requested cosmetic formulation.

Figure 14:
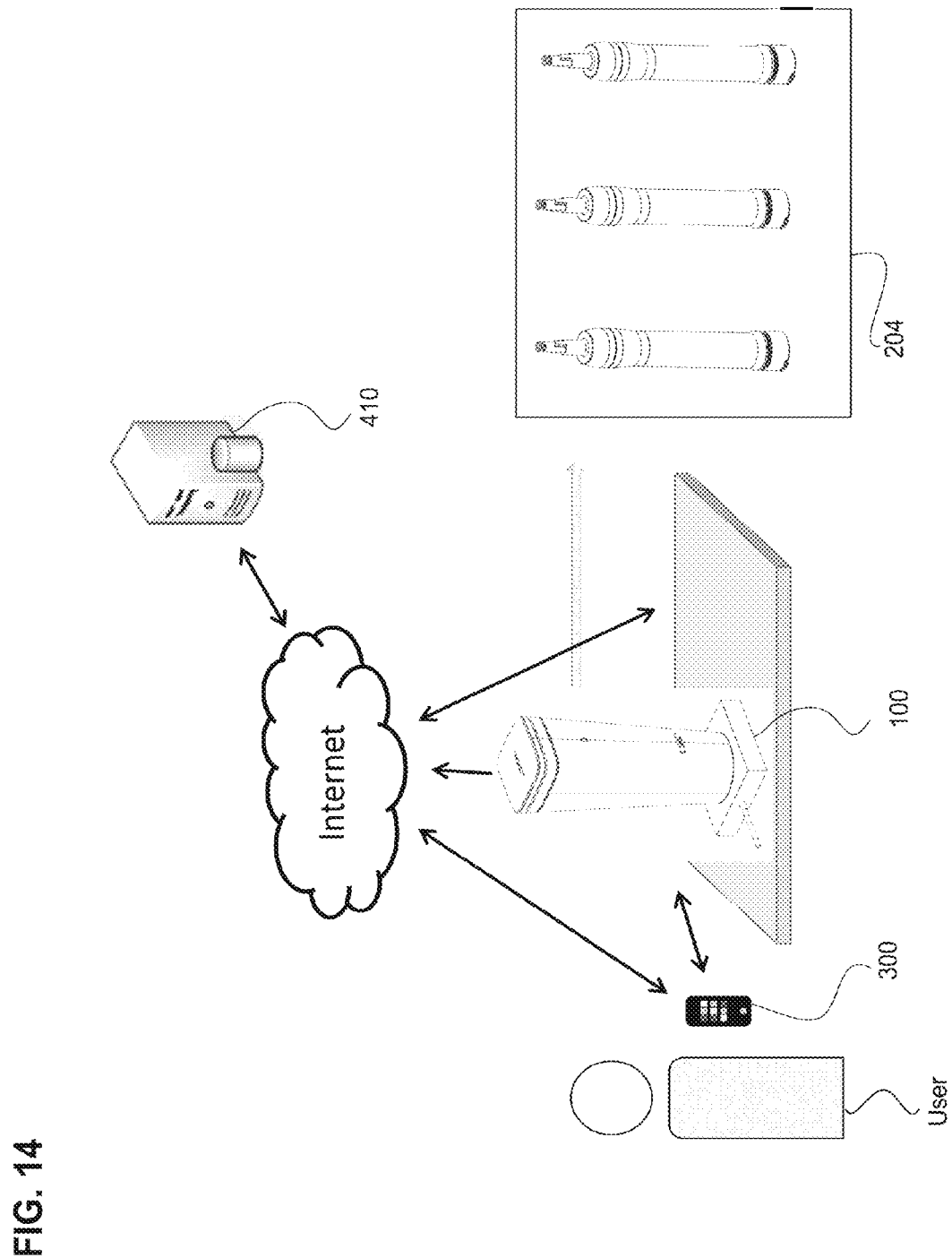
FIG. 14 is a diagram representing an example of a connected cosmetic dispensing system, according to one example.

FIG. 14 is a diagram representing an example of a connected cosmetic dispensing system, according to one example. A system 400, which implements the cosmetic dispenser 100 described above, includes at least the cosmetic dispenser 100 and a connected device 300. Optionally, the system may further include one or more external servers 410 which are implemented as part of a cloud-computing environment. Furthermore, the system may optionally include a cosmetic material inventory 204 which is an inventory of possible cosmetic material that may be inserted into the cosmetic device 100.

The connected device 300 may be a personal computer (PC), a laptop computer, a PDA (Personal Digital Assistants), a smart phone, a tablet device, a UMPC (Ultra Mobile Personal Computer), a net-book, or a notebook type personal computer. In the below examples, the connected device 300 is assumed to be a tablet device, such as an Apple iPad.

The connected device 300 is capable of performing wireless communication with the cosmetic dispenser 100 by way of a wireless communication interface circuitry 774 on the cosmetic dispenser 100. However, connected device 300 is also capable of having a wired connection to the cosmetic dispenser 100 by way of a USB interface 776 on the apparatus 100. Additionally, each device, including the cosmetic dispenser 100, may communicate with each other and the external one or more devices through an internet connection via an 802.11 wireless connection to a wireless internet access point, or a physical connection to the internet access point, such as through an Ethernet interface. Each connected device 300 is capable of performing wireless communication with other devices, such as through a Bluetooth connection or other wireless means as well.

The connected device 300 is configured to receive information from a user for use in generating a cosmetic formulation that will be used by the cosmetic dispenser 100 to dispense cosmetic material into the compact 108.

Figure 15:
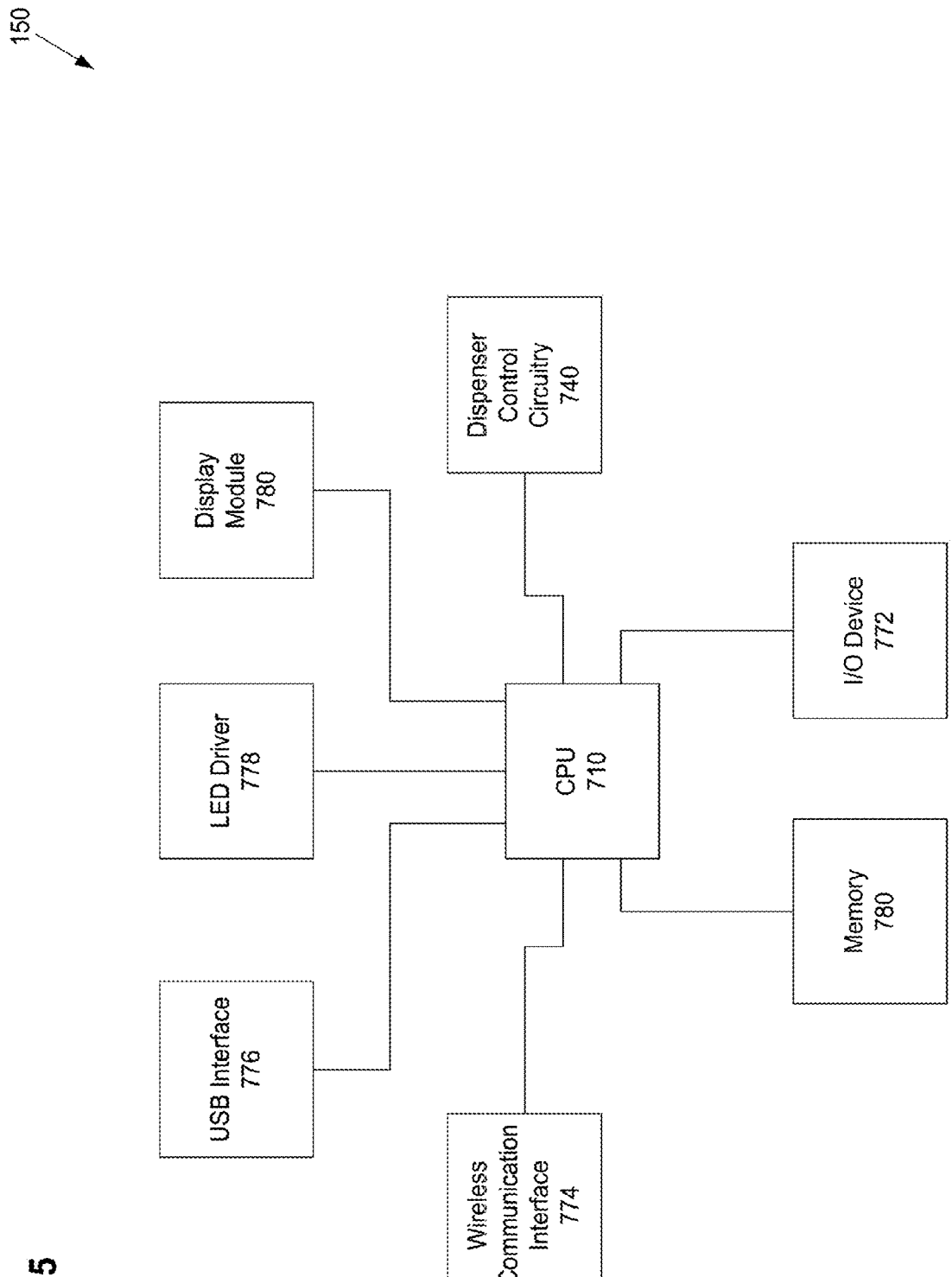
FIG. 15 is a diagram representing example circuitry of the controller and the cosmetic dispenser, according to one example.

FIG. 15 is a block diagram representing circuitry of the controller 150 and the cosmetic dispenser 100, according to one example. A central processing unit (CPU) 710 provides primary control over the separate circuitry components included in the apparatus, such as a dispenser control circuitry 740 (which may include control circuitry for the motors 112, circuitry for the optical encoder 192, and inductive sensor circuitry). The CPU 710 may also control an optional input/output device 772 (such as a keyboard or mouse), a memory 780, the wireless communication interface circuitry 774, the universal serial bus (USB) controller 776, an LED driver 778, and a display module 780. The LED driver 778 controls the pulsing of one or more indicator lights 122.

In an embodiment, circuitry includes, among other things, one or more computing devices such as a processor (e.g., a microprocessor, a quantum processor, qubit processor, etc.), a central processing unit (CPU), a digital signal processor (DSP), an application specific integrated circuit (ASIC), a field programmable gate array (FPGA), or the like, or any combinations thereof, and can include discrete digital or analog circuit elements or electronics, or combinations thereof.

In an embodiment, a module includes one or more ASICs having a plurality of predefined logic components.

In an embodiment, a module includes one or more FPGAs, each having a plurality of programmable logic components.

In an embodiment, circuitry includes one or more components operably coupled (e.g., communicatively, electromagnetically, magnetically, ultrasonically, optically, inductively, electrically, capacitively coupled, wirelessly coupled, or the like) to each other.

In an embodiment, circuitry includes one or more remotely located components.

In an embodiment, remotely located components are operably coupled, for example, via wireless communication, such as with a connected device 300.

In an embodiment, remotely located components are operably coupled, for example, via one or more communication modules, receivers, transmitters, transceivers, or the like.

In an embodiment, any of the CPU 710 or other components shown in FIG. 15 may be substituted with alternative circuitry elements. Examples of circuitry include memory that, for example, stores instructions or information. Non-limiting examples of memory include volatile memory (e.g., Random Access Memory (RAM), Dynamic Random Access Memory (DRAM), or the like), non-volatile memory (e.g., Read-Only Memory (ROM), Electrically Erasable Programmable Read-Only Memory (EEPROM), Compact Disc Read-Only Memory (CD-ROM), or the like), persistent memory, or the like. Further non-limiting examples of memory include Erasable Programmable Read-Only Memory (EPROM), flash memory, or the like.

In an embodiment, memory is coupled to, for example, one or more computing devices by one or more instructions, information, or power buses.

In an embodiment, circuitry includes one or more computer-readable media drives, interface sockets, Universal Serial Bus (USB) ports, memory card slots, or the like, and one or more input/output components such as, for example, a graphical user interface, a display, a keyboard, a keypad, a trackball, a joystick, a touch-screen, a mouse, a switch, a dial, or the like, and any other peripheral device.

In an embodiment, a module includes one or more user input/output components that are operably coupled to at least one computing device configured to control (electrical, electromechanical, software-implemented, firmware implemented, or other control, or combinations thereof) at least one parameter associated with, for example, determining one or more tissue thermal properties responsive to detected shifts in turn-ON voltage.

In an embodiment, circuitry includes a computer-readable media drive or memory slot that is configured to accept signal-bearing medium (e.g., computer-readable memory media, computer-readable recording media, or the like).

In an embodiment, a program for causing a system to execute any of the disclosed methods can be stored on, for example, a computer-readable recording medium, a signal-bearing medium, or the like. Non-limiting examples of signal-bearing media include a recordable type medium such as a magnetic tape, floppy disk, a hard disk drive, a Compact Disc (CD), a Digital Video Disk (DVD), Blu-Ray Disc, a digital tape, a computer memory, or the like, as well as transmission type medium such as a digital or an analog communication medium (e.g., a fiber optic cable, a waveguide, a wired communications link, a wireless communication link (e.g., receiver, transmitter, transceiver, transmission logic, reception logic, etc.). Further non-limiting examples of signal-bearing media include, but are not limited to, DVD-ROM, DVD-RAM, DVD+RW, DVD-RW, DVD-R, DVD+R, CD-ROM, Super Audio CD, CD-R, CD+R, CD+RW, CD-RW, Video Compact Discs, Super Video Discs, flash memory, magnetic tape, magneto-optic disk, MINIDISC, non-volatile memory card, EEPROM, optical disk, optical storage, RAM, ROM, system memory, web server, or the like.

In an embodiment, circuitry includes acoustic transducers, electroacoustic transducers, electrochemical transducers, electromagnetic transducers, electromechanical transducers, electrostatic transducers, photoelectric transducers, radio-acoustic transducers, thermoelectric transducers, or ultrasonic transducers.

In an embodiment, circuitry includes electrical circuitry operably coupled with a transducer (e.g., an actuator, a motor, a piezoelectric crystal, a Micro Electro Mechanical System (MEMS), etc.).

In an embodiment, circuitry includes electrical circuitry having at least one discrete electrical circuit, electrical circuitry having at least one integrated circuit, or electrical circuitry having at least one application specific integrated circuit.

In an embodiment, circuitry includes electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernable variants of the teachings herein, define, in part, the scope of the foregoing claim terminology such that no inventive subject matter is dedicated to the public.

The invention claimed is:

1. An apparatus for dispensing cosmetic material, comprising:
   a dispensing assembly configured to receive at least one cartridge that contains a cosmetic material and to dispense a specified amount of the cosmetic material from the cartridge into a receiving area;
   a memory configured to receive and store dispensing information which includes the specified amount of the cosmetic material to be dispensed for each cartridge disposed in the dispensing assembly to achieve a specified single use of a cosmetic application; and
   circuitry configured to obtain the dispensing information from the memory and to control the dispensing assembly to dispense the cosmetic material from each cartridge disposed in the dispensing assembly into the receiving area according to the one or more specified amounts included in the dispensing information,
   wherein the receiving area is configured to be part of a detachable portion of the apparatus, the detachable portion is configured to be an enclosed container that holds the dispensed cosmetic material, and the apparatus further comprises:
   a manifold, having a plurality of manifold through holes, the manifold connected to and disposed on a nozzle of the cartridge, the receiving area being connected to and disposed above the manifold,
   wherein the circuitry controls the dispensing assembly to dispense a quantity of cosmetic material from the nozzle of the cartridge through one manifold through hole of the manifold, and into the receiving area.

2. The apparatus according to claim 1, wherein the dispensing assembly is configured to receive a plurality of cartridges that contain different cosmetic material and to simultaneously dispense a specified amount of the respective cosmetic material from each of the cartridges into the receiving area to be mixed together.

3. The apparatus according to claim 1, wherein the enclosed container includes:
   a top lid;
   a base, having a plurality of base through holes; and
   a bottom lid, having a plurality of bottom lid through holes,
   wherein the top lid is connected to a first side of the base, the bottom lid is connected to a second side of the base, the bottom lid is connected to the manifold, the plurality of manifold through holes are aligned with and connected to the plurality of bottom lid through holes, the plurality of base through holes aligned with and connected to the plurality of base through holes.

4. The apparatus for dispensing cosmetic material according to claim 3, the enclosed container further comprising:
   a plurality of mounting magnets, disposed between the base and the bottom lid,
   wherein the plurality of mounting magnets magnetically secure the enclosed container to the manifold.

5. The apparatus for dispensing cosmetic material according to claim 3, the enclosed container further comprising:
   a plurality of lid magnets, disposed between the base and the bottom lid,
   wherein the plurality of lid magnets magnetically secure the top lid to the base and the bottom lid.

6. The apparatus for dispensing cosmetic material according to claim 3, the enclosed container further comprising:

a plurality of hinge magnets,
wherein half of the plurality of hinge magnets are disposed between the base and the bottom lid, half of the plurality of hinge magnets are disposed within the top lid, the plurality of hinge magnets disposed within the top lid having opposite magnetic polarity of the corresponding plurality of hinge magnets disposed between the base and the bottom lid, the top lid magnetically hinged and disposed about the base and the bottom lid in at least one position.

7. The apparatus for dispensing cosmetic material according to claim 3, wherein:
the top lid is only magnetically connected to the base and the bottom lid, and the top lid is fully removable from the base and the bottom lid.

8. The apparatus for dispensing cosmetic material according to claim 3, wherein:
the enclosed container may be connected to the manifold in at least one position such that the plurality of manifold through holes aligns with the plurality of bottom lid through holes and the plurality of base through holes, allowing cosmetic material to be dispensed from the cartridge into to the compact.

9. The apparatus for dispensing cosmetic material according to claim 3, wherein:
each bottom lid through hole has a duckbill valve, allowing cosmetic material to be dispensed from the cartridge through the duckbill valve into the enclosed container, and preventing cosmetic material from flowing out of the enclosed container.

10. An apparatus for dispensing cosmetic material, comprising:
a dispensing assembly configured to receive at least one cartridge that contains a cosmetic material and to dispense a specified amount of the cosmetic material from the cartridge into a receiving area;
a memory configured to receive and store dispensing information which includes the specified amount of the cosmetic material to be dispensed for each cartridge disposed in the dispensing assembly to achieve a specified single use of a cosmetic application; and
circuitry configured to obtain the dispensing information from the memory and to control the dispensing assembly to dispense the cosmetic material from each cartridge disposed in the dispensing assembly into the receiving area according to the one or more specified amounts included in the dispensing information, the dispensing assembly, further comprising:
a cartridge gear, connected to a first end of the cartridge;
a motor gear, rotatably connected to the cartridge gear;
a motor, connected to the motor gear, wherein rotation of the motor drives rotation of the motor gear, the cartridge gear, and the first end of the cartridge; and
an optical encoder, disposed adjacent to at least one of the set consisting of the cartridge gear and the motor gear;
wherein the circuitry dispenses a quantity of cosmetic material from cartridge and into the receiving area, by detecting the position of at least one of the set consisting of the cartridge gear and the motor gear with the optical encoder, and controlling the direction and magnitude of rotation of the motor to rotate the first end of the cartridge.

11. The apparatus for dispensing cosmetic material according to claim 10, wherein:
the cartridge gear further comprises:
a plurality of cartridge gear slots,
wherein, the optical encoder detects the position of the cartridge gear by detecting the cartridge gear slots during rotation of the cartridge gear.

12. The apparatus for dispensing cosmetic material according to claim 11, wherein the circuitry stores information of a quantity of cosmetic material remaining in a cartridge based on the total number of cartridge gear slots detected to rotate since the cartridge was inserted into the dispensing assembly.

13. A method, implemented by an apparatus for dispensing cosmetic material, the apparatus including a dispensing assembly configured to receive at least one cartridge that contains a cosmetic material and to dispense a specified amount of the cosmetic material from the cartridge into a receiving area, the method comprising:
receiving and storing, at a memory, dispensing information which includes the specified amount of the cosmetic material to be dispensed for each cartridge disposed in the dispensing assembly to achieve a specified single use of a cosmetic application; and
obtaining, by circuitry of the apparatus, the dispensing information from the memory and controlling the dispensing assembly to dispense the cosmetic material from each cartridge disposed in the dispensing assembly into the receiving area according to the one or more specified amounts included in the dispensing information,
wherein the receiving area is configured to be part of a detachable portion of the apparatus, the detachable portion is configured to be an enclosed container that holds the dispensed cosmetic material, and the apparatus further includes:
a manifold, having a plurality of manifold through holes, the manifold connected to and disposed on a nozzle of the cartridge, the receiving area being connected to and disposed above the manifold,
wherein the method further comprises controlling, by the circuitry of the apparatus, the dispensing assembly to dispense a quantity of cosmetic material from the nozzle of the cartridge through one manifold through hole of the manifold, and into the receiving area.

14. An apparatus for dispensing cosmetic material, comprising:
a dispensing means for receiving at least one cartridge that contains a cosmetic material and to dispense a specified amount of the cosmetic material from the cartridge into a receiving area;
storage means for receiving and storing dispensing information which includes the specified amount of the cosmetic material to be dispensed for each cartridge disposed in the dispensing assembly to achieve a specified single use of a cosmetic application; and
controlling means for
obtaining the dispensing information from the storage means and for controlling the dispensing means to dispense the cosmetic material from each cartridge disposed in the dispensing assembly into the receiving area according to the one or more specified amounts included in the dispensing information, and
controlling the dispensing means to dispense the determined amount of each of the one or more cosmetic materials from the plurality of cartridges,
wherein the receiving area is configured to be part of a detachable portion of the apparatus, the detachable portion is configured to be an enclosed container that holds the dispensed cosmetic material, and the apparatus further comprises:
a manifold, having a plurality of manifold through holes, the manifold connected to and disposed on a nozzle of the cartridge, the receiving area being connected to and disposed above the manifold,
wherein the controlling means controls the dispensing assembly to dispense a quantity of cosmetic material from the nozzle of the cartridge through one manifold through hole of the manifold, and into the receiving area.

15. A method, implemented by an apparatus for dispensing cosmetic material, the apparatus including a dispensing assembly configured to receive at least one cartridge that contains a cosmetic material and to dispense a specified amount of the cosmetic material from the cartridge into a receiving area, the method comprising:
receiving and storing, at a memory, dispensing information which includes the specified amount of the cosmetic material to be dispensed for each cartridge disposed in the dispensing assembly to achieve a specified single use of a cosmetic application; and
obtaining, by circuitry of the apparatus, the dispensing information from the memory and controlling the dispensing assembly to dispense the cosmetic material from each cartridge disposed in the dispensing assembly into the receiving area according to the one or more specified amounts included in the dispensing information,
wherein the dispensing assembly further includes:
a cartridge gear, connected to a first end of the cartridge;
a motor gear, rotatably connected to the cartridge gear;
a motor, connected to the motor gear, wherein rotation of the motor drives rotation of the motor gear, the cartridge gear, and the first end of the cartridge; and
an optical encoder, disposed adjacent to at least one of the set consisting of the cartridge gear and the motor gear; and
wherein the method further comprises dispensing a quantity of cosmetic material from cartridge and into the receiving area, by detecting the position of at least one of the set consisting of the cartridge gear and the motor gear with the optical encoder, and controlling the direction and magnitude of rotation of the motor to rotate the first end of the cartridge.

* * * * *